US007349943B2

(12) United States Patent
Lin et al.

(10) Patent No.: US 7,349,943 B2
(45) Date of Patent: *Mar. 25, 2008

(54) PROTOCOL-INDEPENDENT CLIENT-SIDE CACHING SYSTEM AND METHOD

(75) Inventors: Yun Lin, Kirkland, WA (US); Navjot Virk, Redmond, WA (US); Shishir Pardikar, Redmond, WA (US); Rohan Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

This patent is subject to a terminal disclaimer.

(21) Appl. No.: 10/387,972

(22) Filed: Mar. 12, 2003

(65) Prior Publication Data

US 2004/0181576 A1    Sep. 16, 2004

(51) Int. Cl.
*G06F 15/16* (2006.01)
*G06F 12/00* (2006.01)

(52) U.S. Cl. .................. 709/203; 709/213; 709/217; 711/118; 711/141

(58) Field of Classification Search ........ 709/213–215, 709/203, 217–219, 227, 239; 711/118–123, 711/141; 707/10
See application file for complete search history.

(56) References Cited

U.S. PATENT DOCUMENTS

| | | | | |
|---|---|---|---|---|
| 5,721,916 A | * | 2/1998 | Pardikar | 707/201 |
| 6,065,043 A | * | 5/2000 | Domenikos et al. | 709/203 |
| 6,604,143 B1 | * | 8/2003 | Nagar et al. | 709/229 |
| 6,654,748 B1 | * | 11/2003 | Rabung et al. | 707/10 |
| 6,757,705 B1 | * | 6/2004 | Pardikar et al. | 709/203 |
| 6,772,225 B1 | * | 8/2004 | Jennings et al. | 709/240 |
| 7,089,284 B2 | * | 8/2006 | Pardikar et al. | 709/203 |
| 2002/0176418 A1 | * | 11/2002 | Hunt et al. | 370/389 |
| 2005/0091226 A1 | * | 4/2005 | Lin et al. | 707/100 |

FOREIGN PATENT DOCUMENTS

| | | |
|---|---|---|
| EP | 1233351 | 8/2002 |
| WO | WO 00/29990 | 5/2000 |

* cited by examiner

*Primary Examiner*—Glenton B. Burgess
*Assistant Examiner*—Brendan Y. Higa
(74) *Attorney, Agent, or Firm*—Workman Nydegger

(57) ABSTRACT

A system and method that automatically and transparently handle client-side caching of network file data, independent of any remote file handling protocol. A protocol-independent client-side caching mechanism is inserted as a service that handles file-related requests directed to a network, and attempts to satisfy the requests via a client-side caching persistent store. By way of pre-process and post-process calls on a file create request, the caching mechanism creates file-related data structures, and overwrites the information in those structures that a buffering service uses to call back to a network redirector, whereby the client-side caching mechanism inserts itself into the communication flow between the network redirector and the buffering service. Once in the flow of communication, network-directed file read and write requests may be transparently handled by the client-side caching mechanism when appropriate, yet the redirector may be instructed to communicate with the server when needed to satisfy the request.

41 Claims, 13 Drawing Sheets

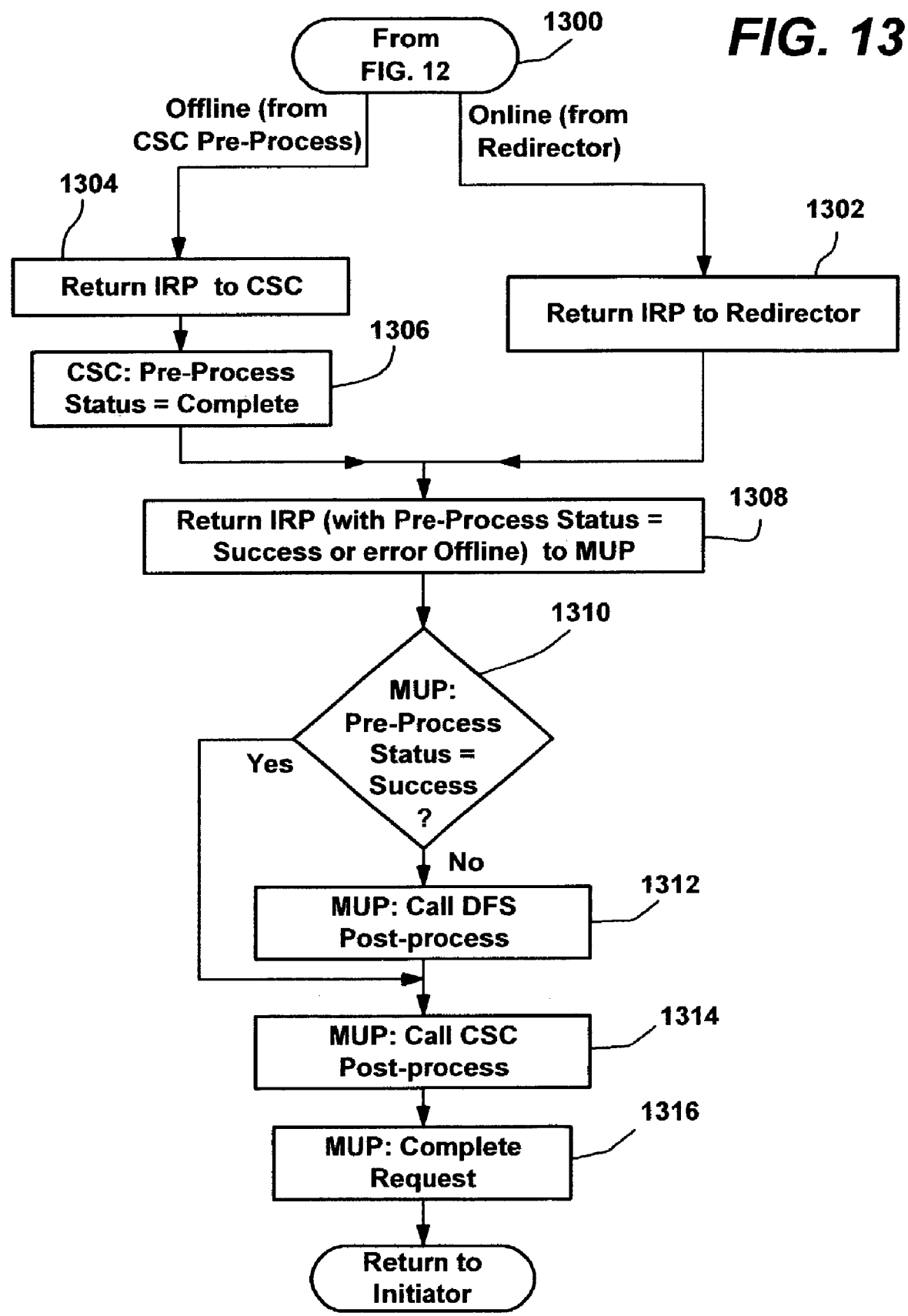

PROTOCOL-INDEPENDENT CLIENT-SIDE CACHING SYSTEM AND METHOD

FIELD OF THE INVENTION

The present invention relates generally to computers networks, and more particularly to data storage in a network environment.

BACKGROUND OF THE INVENTION

Network servers store and provide access to client data using various mechanisms, including mechanisms generally based on the concept of a redirector, in which an application program's file-related requests are redirected to an appropriate server. The server receives each request, and performs the requested file operation, that is, as long as no errors, access right violations or other problems occurred. The server then returns a success status along with any corresponding data, such as a file handle for a create/open request, or file data for a read request, which the application program receives in response to its request.

Because computer users are not always connected to their network file server or servers, various client-side caching mechanisms have been developed that allow offline access to local file copies when the network version of the file is otherwise unavailable, such as due to a network outage or intentional disconnection. One such caching mechanism is referred to as a briefcase, in which a user manages a local file cache by dragging files to and from a displayed briefcase, essentially manually deciding what files are cached, when they are cached, and resolving any merge (conflicting file version) issues. As can be readily appreciated, the briefcase mechanism requires a significant amount of user interaction, making it relatively inconvenient for users. Moreover, the briefcase mechanism has its own namespace that is independent of the file system namespace, e.g., a filename can exist in both the briefcase namespace and the file system namespace, or in one but not the other. Applications do not directly or transparently benefit from the briefcase mechanism, because the briefcase is a shell program, and is not part of the operating system and/or the file system that application programs rely on to perform file-related operations.

A recent improvement in client-side caching is described in U.S. patent application Ser. No. 09/134,720, which is generally directed towards a persistent client-side cache of files. With this improvement, a network client can access a locally-cached copy of a file using the same filename and with the same namespace as when the client is connected to the network. Automatic caching is provided, (although manual configuration is still possible), thereby reducing much of the need for user interaction. Further, in this improvement, much of the client-side caching technology is built into the CIFS (Common Internet File System) redirector, which uses the CIFS remote file-access protocol, a published extension to the well-known SMB (server message block) protocol. Because the caching is handled in a redirector, application programs transparently benefit from the cache. For example, when a user is disconnected from the network, requested file operations may be automatically redirected to the cached copy of the file instead of the server.

While such client-side caching technology thus provides many benefits, essentially by providing access to needed files when disconnected from the network or when the network is down, there are still a number of drawbacks to current client-side caching mechanisms. One such drawback is that existing caching technology is tightly integrated with the CIFS redirector. Transparent client-side caching is thus unavailable for other server types having other protocols, such as WebDAV-based (or simply DAV, Distributed Authoring and Versioning), and NFS-based (Network File System) servers/protocols. Adding similar caching technology to each redirector would require modification of the various redirector components, which would be undesirable if not impractical, particularly with third party redirector drivers.

In sum, what is needed is a method and system that are protocol-independent with respect to client-side file caching, to thereby provide a uniform offline experience for users across server types, yet substantially without requiring changes to existing networking components. The method and system should be transparent to users and existing applications, and overcome other drawbacks associated with current client-side caching.

SUMMARY OF THE INVENTION

Briefly, the present invention provides a system and method that automatically and transparently handle client-side caching of network file data, independent of any remote file handling protocol. A protocol-independent client-side caching mechanism is inserted as a service that handles file-related requests directed to a network and attempts to satisfy the requests via a client-side caching persistent store. To this end, in one architecture, when online, a client-side caching mechanism in the form of a surrogate provider is inserted in the communications flow between a network redirector component and a buffering service that the redirector calls to determine if a file-related (e.g., read or write) request can be handled via the buffering service's in-memory buffer. In general, in this architecture, the client-side caching mechanism is provided as a filter driver in a filter stack, in a manner that makes the client-side caching mechanism appear as a redirector to the buffering service, yet also appear to be the buffering service to a redirector. This insertion of the client-side caching mechanism into the communications flow is accomplished, in part, at the end of a file create/open request by overwriting redirector device object data (present in data structures for the file) that the buffering service uses to return to the calling provider, so that the buffering service instead calls the client-side caching mechanism.

To enable the client-side caching mechanism to handle network file-related input-output (I/O) requests, the client-side caching mechanism registers as a surrogate provider with a system component that receives network file-related I/O requests, which in one implementation is referred to as a Multiple UNC (Uniform Naming Convention) Provider, or MUP. The MUP calls a pre-process handler of the client-side caching mechanism before any file-related request is provided to any other surrogate provider or any redirector. The MUP also calls a post-process handler of the client-side caching mechanism after any file-related request is provided to any other surrogate provider or any redirector. In this manner, for file creates, the client-side caching mechanism can generate and configure needed data structures to handle further requests.

For example, for file creates (or opens), an I/O manager creates a file object, parses the name, and when the name indicates that the file is a remote object, forwards the request to the MUP. Before sending the create request to another surrogate provider or any redirectors, the MUP sends the request to the client-side caching mechanism (surrogate provider) in the pre-process operation. The client-side caching mechanism pre-process handler creates data structures that are associated with the file object, including logical connection structures related to the file copy in the logical namespace, and related file-based data structures associated with the file object, which if online may be shared between the client-side caching mechanism's and redirector's structures. In known to be offline, (e.g., from a previous create request), the client-side caching pre-process handler will complete the request.

When online or if the connection status is not known, the client-side caching mechanism returns a "more processing required" status to the MUP, which in turn will call a DFS surrogate provider, which in general changes the namespace related to the request from logical to physical. The MUP will the call the redirectors if necessary, to allow one of them to claim the path if there is an online connection, and create physical connection-based data structures related to the file at the network server. When the client-side caching mechanism post-process handler is called, the post-process handler will complete its logical data structures as appropriate based on the information in the data structures. The post-process handler will also decide whether this file is offline or online (e.g., claimed by a redirector). The post-process handler overwrites redirector-related data (e.g., a pointer to the redirector dispatch table in a file control block data structure) so that when online, the buffering service will call the client-side caching mechanism instead of the redirector. The client-side caching mechanism maintains a copy of the redirector (pointer) data in association with the file, so that the client-side caching mechanism can communicate with the redirector as appropriate, thereby inserting itself into the communication flow between the buffering service and the redirector. If the redirector returns a network related error, the client-side caching post process treats the file as offline, whereby requests to the file will be attempted to be satisfied from the client-side cache, without invoking the redirector. If caching is disabled (by the server), the client-side caching mechanism post process may then disassociate itself from the file object, whereby the MUP will not forward any request associate with this file object. For example, by not overwriting the redirector-related data on the file control block, the client-side caching mechanism will not be involved in the control flow of subsequent file I/O associated with this file object.

In both the offline and online creates, create requests to the same file are synchronized at the client-side caching pre-process. To this end, if another create directed to the same file is sent to the client-side caching pre-process, the client-side caching pre-process holds each later create request until the current one completes.

For other (non-create) file requests such as read, write or close, when offline, the client-side caching mechanism can take a first look at the request in its pre-process, and when appropriate such as for read and write requests, may attempt to satisfy the request in memory by calling a buffering service. If the corresponding data is not cached in memory (a cache miss occurred), and thus cannot be immediately read or written to by the buffering service, the buffering service holds the first request, and generates another, second request (e.g., by a cache manager/memory manager of the buffering service). When this second request reaches the client-side caching pre-process, it invokes the buffering service, which recognizes the request as having been generated by a cache miss, and thus does not look for the data in the cache, but instead calls the client-side caching mechanism. The client-side caching mechanism processes the request and attempts to obtain the needed data from an offline cache copy in a persistent store, and returns the data to the cache manager/memory manager. The cache manager/memory manager can then copy the data to the in-memory cache, and complete the I/O request, e.g., return the data for read requests or alter the data in the cache memory for write requests. If the client-side caching mechanism cannot obtain the needed data from its store, because the connection is offline for this file, the client-side caching mechanism returns an error. Thus, on a cache miss, the buffering service completes the first request based on the result from the client-side caching mechanism's processing of a second request (generated by a buffering service component) to provide data for the in-memory cache.

For a non-create file I/O request when online, the client-side caching mechanism pre-process returns a "more processing required" status to the MUP, which then calls any other surrogate providers and then forwards the request to the corresponding redirector. In turn, the redirector calls the buffering service (e.g., by calling a buffering subsystem of the service) to attempt to satisfy the request from memory. If the corresponding data is not cached in memory, the buffering service holds the first request, and a component thereof (e.g., a cache manager/memory manager) generates another, second request. When this second request reaches the redirector, it again invokes the buffering service, but this time the buffering service recognizes the request as having been generated by a cache miss, and thus knows to not again look for the data in the cache. However, although the redirector called the buffering subsystem of the buffering service, because the client-side caching post-process overwrote the redirector pointer in the dispatch table, the buffering service calls the client-side caching mechanism. The client-side caching mechanism processes the request if the request can be satisfied using an offline cache copy in a persistent store. If unable to satisfy the request, the client-side caching mechanism (which saved the redirector pointer) calls the redirector to attempt to satisfy the request from the server. The redirector returns to the client-side caching mechanism, which may caches the data returned by the redirector in its local persistent store, and then returns to the buffering subsystem, which completes the second request, thereby reaching the caching components of the buffering service. The caching components then complete the first request and cache returned data into the in-memory cache based on the result from the client-side caching mechanism's (and possibly redirector's) processing of the second request. Conceptually, the client-side caching mechanism inserts itself so as to intercept calls from the buffering service to the redirector, among other things, to see if data that is needed can be satisfied from the client-side caching offline store.

When a close is issued for a file that has an online connection, the MUP sends the request to the client-side caching mechanism pre-process. The client-side caching mechanism then checks if there is any data that has not yet been sent to the server. If so, the client-side caching mechanism flushes any dirty pages to the server. The client-side caching mechanism then sends the close request to the redirector for that connection, de-references its data structures and completes the request. Other requests are processed similarly. When the connection is offline, the client-side caching mechanism performs the tasks locally.

As can be seen, because the client-side caching mechanism works with network file-related requests external to the redirector, the client-side caching mechanism is protocol-independent, and can work with any redirector protocol, as long as the redirector participates in the buffering service (or similar) architecture.

Other advantages will become apparent from the following detailed description when taken in conjunction with the drawings, in which:

BRIEF DESCRIPTION OF THE DRAWINGS

FIGS. 11-13 comprise a flow diagram generally representing example logic for handling a read request in accordance with an aspect of the present invention.

DETAILED DESCRIPTION

Exemplary Operating Environment

Figure 1:
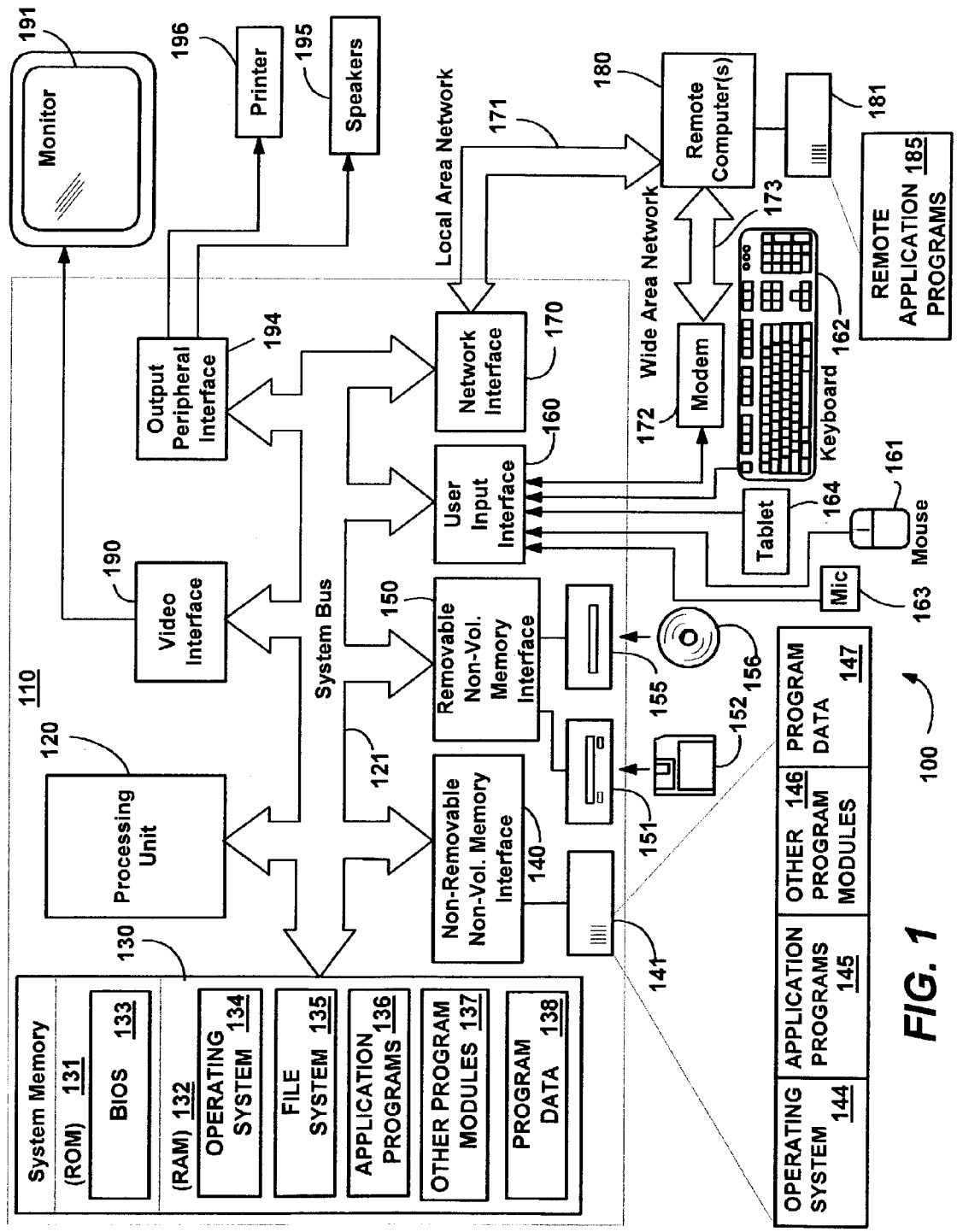
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Client-Side Caching System and Method

The present invention will be generally described in the context of Microsoft Corporation's Windows® XP operating system, using protocol-based redirectors, the NTFS file system and other components, (e.g., an I/O manager, a cache manager and memory manager). Notwithstanding, as will be understood, the present invention may be implemented with virtually any operating system and/or file system.

Figure 2:
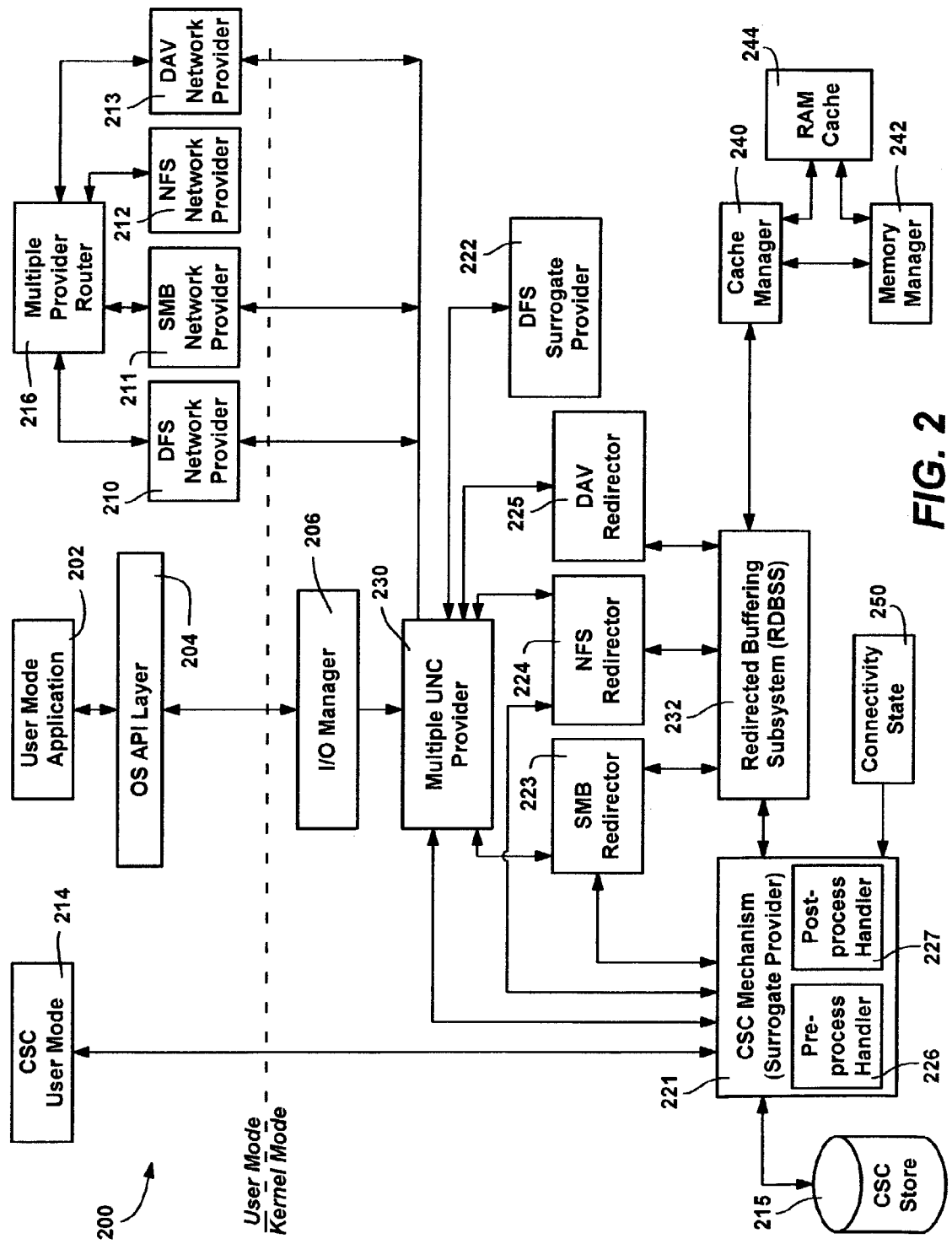
FIG. 2 is a block diagram generally representing components for implementing aspects of client-side caching in accordance with an aspect of the present invention.

Turning to FIG. 2 of the drawings, there is shown an example architecture 200 for implementing the present invention, in which a user mode application program 202 may call various system functions via an application programming interface (API) layer 204. For accessing network resources, the application program 202 makes file input-output (I/O) API calls directed to a network resource, via an I/O manager 206. For example, in a Windows®-based operating system, application programs can examine or access resources on remote systems by using a UNC (Uniform Naming Convention) standard with Win32 functions to directly address a remote resource, e.g., in the form \\server\share, or via a drive letter mapped to a network shared folder or the like.

Figure 3:
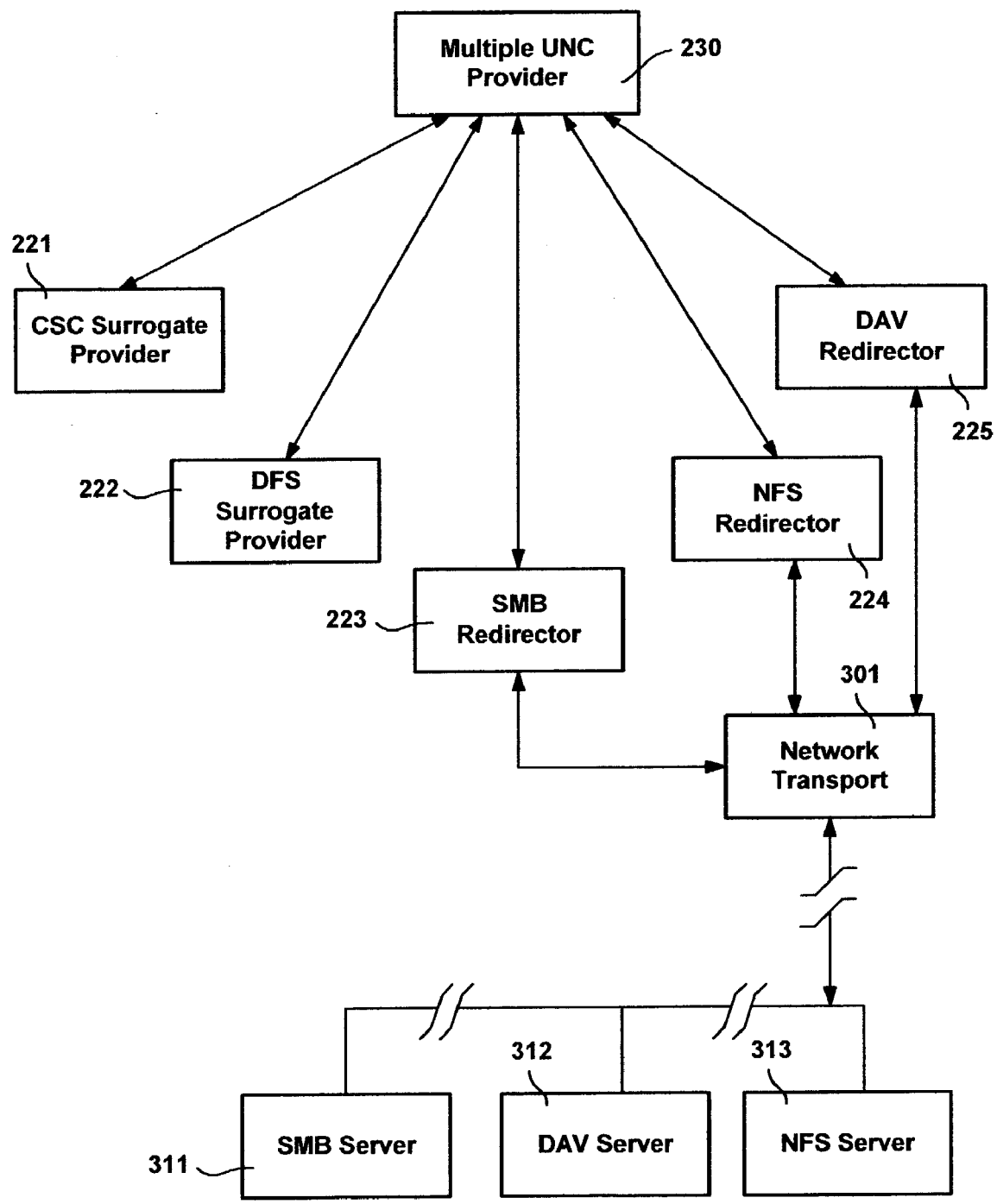
FIG. 3 is a block diagram generally representing components for implementing client-side caching and redirection to servers in accordance with an aspect of the present invention.

Another way an application can access network resources is by calling networking APIs, (e.g., Win32 Windows Networking (WNet) APIs in the Windows® 2000 operating system), such as to enumerate a server's files when browsing. Via these WNet APIS, applications and/or operating system components can enumerate computers and resources that remote computers export for sharing. To this end, user mode network providers 210-213 each comprise software code that establishes the operating system as a client of a remote network server, or, with the present invention, as a client of a client-side cache (generally acting as a server). For example, some of the operations a network provider performs include making and breaking network connections and querying network resource status. Thus, typical functions provided by a network provider include capabilities functions, which allow the caller to determine the capabilities of the network provider, and device redirecting functions, which allow a network provider to redirect drive letters, MS-DOS® devices, and LPT ports. Other functions include provider-specific dialog functions, which allow a network provider to display or act on network-specific information, administrative functions, which allow a network provider to display or act on special network directories, and enumeration functions, which allow browsing of network resources. For example, via the SMB network provider 211, the operating system can enumerate network shares on an SMB server 311 (FIG. 3).

To determine which network provider to call when an application calls a networking routine of the APIs 204, in one implementation, the call passes to a multiple network provider router, or MPR 216, which may be installed as a Dynamic Link Library (DLL). In general, the MPR 216 determines which user mode network provider recognizes the resource being accessed. To this end, each installed network provider beneath the MPR 216 supplies a set of functions collectively called a network provider interface that allows the MPR 216 to determine which network the application is trying to access, and to direct the request to the appropriate network provider software. For example, the network provider for SMB comprises a LANMAN (local area network manager) network provider 211 as specified in a system registry key or the like.

In a described implementation, when called to connect to a remote network resource, the MPR 216 checks the registry to determine which network providers are loaded. The MPR 216 then polls them, such as one at a time in the order in which they are listed in the registry, which is configurable, and each network provider (e.g., DAV network provider 213) may further communicate with its corresponding kernel mode component (e.g., DAV redirector 225) until the resource is recognized or until the available network providers have been polled. Thus, in the event of a networking API call that is directed to a network resource, e.g., via a URL passed as a call parameter to a DAV server, the MPR 216 will poll the DAV network provider 213, which in turn call via RPC (remote procedure call) into a service to contact the kernel mode DAV redirector 225 to determine if the API can be handled, e.g., if the specified DAV share is indeed an accessible DAV server 312 (FIG. 3). If so, the API is handled by the DAV redirector component 225.

Applications may also transparently access network resources via a UNC name or drive letter previously mapped to a resource. When a file I/O API (e.g., a file create/open request) is called with a remote path/filename such as a UNC name, the file I/O request is received at an I/O manager 206. To handle the remote name, the I/O manager 206 calls a Multiple UNC Provider, or MUP 230, (e.g., comprising a kernel mode driver) which is registered with the system as a UNC provider. In general, the MUP 230 figures out which network provider (e.g., of the set of providers 210-213) and corresponding kernel components such as one of the network redirectors 223-225 handles that particular name. Note that only three redirectors are shown in the present example, however a lesser or greater number of redirectors may be available in a given system.

To determine the correct redirector for a requested file create path, the MUP 230 essentially polls registered providers/redirectors until one claims the path provided in the create request. In one implementation, the MUP 230 polls via asynchronous I/O request packets, or IRPs, and each redirector that can handle the name responds back. If more than one respond affirmatively, the MUP 230 determines from a priority order (e.g., maintained in at least one system registry key or the like) which one has precedence to handle the request. Once the path is claimed, when an application program 202 uses an I/O API call to access the remote file, the MUP 230 knows which redirector to invoke to handle the request.

When at least one redirector responds and claims the path, the MUP driver 230 caches the path information in association with the redirector that responded, (if more than one, it caches the information of the one that takes precedence), whereby further requests beginning with that path string are sent directly to that redirector, without the polling operation. Note that as part of the response to the MUP 206, each redirector that recognizes the name indicates how much of the name is unique to it. For example, if the name is the UNC name \\SERVER\SHARE\foo\bar1.doc and the SMB redirector 223 recognizes the name as capable of being handled, and if the server is an SMB server, the SMB redirector 223 responds by claiming the string "\\SERVER\SHARE" as its own. Thus, future SMB requests directed to a network share corresponding to this cached string are passed to the SMB redirector 223 without polling, and the SMB redirector 223 packages those SMB requests into a data structure that can be sent across the network to a remote SMB server.

In accordance with one aspect of the present invention, when appropriate, a client-side caching (CSC) mechanism 221 in the form of a surrogate provider operates at the redirector level to transparently handle networks requests from a CSC offline store 215, independent of any particular network protocol. In one implementation, the CSC mechanism 221 is involved in the flow of communication from the start. To this end, when a UNC or drive-letter-based network I/O request is received, before contacting any of the redirectors, the MUP 230 communicates with the CSC mechanism 221 via a pre-process call to a CSC pre-process handler 226. The CSC mechanism 221 returns from the pre-process call with status information, as described below. For example, if the connection is known by the pre-process handler 226 to be offline, that is, not connected to the network for this file at the time of create, the client-side caching (CSC) surrogate provider 221 may claim the path and complete the call with a success status. Otherwise, the CSC may return a "more processing required" status, in which event the MUP 230 similarly places a pre-processing call to a distributed file system (DFS) surrogate provider 216, before invoking (calling) one or more of the redirectors 215-217. Note that the CSC mechanism 221 can determine the network connectivity state (like other components) in a known manner, such as by examining the existing connection data structures, registering for network-related events, and so forth, as generally represented in FIG. 2 by connectivity state 250.

The CSC mechanism 221 thus receives a pre-process call for any UNC and drive-letter-based I/O that is directed to the network. Note that to be called by the MUP 230, the CSC mechanism 221 registers itself as a surrogate provider, whereby the MUP 230 knows to call the CSC mechanism 221 with pre-process calls and also post-process calls, for IRPs and FASTIO calls directed to network providers and/or their corresponding redirectors.

After calling the CSC mechanism 221 with a pre-process call that returns with a more-processing-required status, the MUP 230 calls the DFS surrogate provider 218. In general, DFS converts a logical path/filename to a physical path/filename, and provides a system of building a single, unified namespace out of many different servers. A redirector can then claim the appropriately named path for files that the particular redirector handles. At a high level, DFS works by asking the individual servers that comprise the DFS namespace provide for referrals in response to junction points. By way of example, DFS may be used to provide a single namespace for a program's releases built by different servers throughout a division, e.g., the name \\progbuilds\release\lab01\release\x86fre is a junction point to \\robvbl1\release. In this example, to open \\progbuilds\release\lab01\release\x86fre\latest_tested_build.txt, the \\progbuilds server will return referral as \\robvbl1\release\latest_tested_build.txt and tell the client to try the request again.

As can be appreciated, the general algorithm to handle a junction point modifies the left part of the name. A name can traverse multiple junction points, resulting in multiple name revisions, before finally contacting the destination server. Putting the filename identifier to the right allows the identifier to remain in the name even as the servers change the client-supplied name to handle the junction points.

Thus, in the architecture of FIG. 2, and also as generally represented in FIG. 3, with the MUP 230 registered as the UNC provider, UNC calls are fielded by the MUP 230, which in turn hands them down to the first one of the appropriate surrogate providers, namely the CSC mechanism 221. Depending on the returned status, the MUP 230 may hand the UNC call to one or more other surrogate providers (e.g., 222), and to the redirectors 223-225, which via a network transport layer 301 or the like communicate data to and from servers 311-313 that correspond to the redirectors' protocols. Because of the pre-process and post-process calling scheme, the CSC mechanism 221 filters calls going through the MUP 230, thus allowing the CSC mechanism 221 the ability to decide on caching operations for whatever pathnames are considered appropriate. Conceptually, the CSC mechanism 221 is in the path of every call that the MUP 230 handles, allowing the CSC mechanism 221 to do whatever pre-processing and post-processing that the CSC mechanism 221 needs to perform the appropriate client-side caching functionality, as generally described below. Moreover, in this architecture, because the CSC mechanism 221 operates before the DFS surrogate provider 222 for pre-process calls (and after DFS on post-process calls), any DFS operations are transparent to CSC, as the names that the CSC mechanism 221 sees are logical names rather than physical names. As represented in the architecture of FIG. 2, the CSC mechanism 221 and the DFS surrogate provider 222 are at the general level of the MUP 230.

In accordance with another aspect of the present invention, the client-side caching functionality is protocol-independent, e.g., it works with any redirector. To this end, the client-side caching functionality has been moved out of any protocol-dependent redirector (i.e., the SMB redirector 223), and is transparently made part of the flow of control between a redirector and a redirected buffering subsystem (RDBSS) 232. As is known, the redirected buffering subsystem 232 provides cache manager 240 and memory manager 2442 (in-memory RAM cache 244) services to the redirectors 223-225, which each contact the RDBSS 232 to utilize an in-memory cache 244 when appropriate. By inserting the CSC mechanism 221 (as a driver) into the flow of control between the redirectors and the redirected buffering subsystem 232 as described below, the client-side caching functionality is made available as a common service for each redirector, independent of any network protocol, but essentially transparent to the redirectors 223-225 and the redirected buffering subsystem 232. Note that as used herein, the term "buffering service" refers to any component or components that handles file-related data buffering, including the buffering services collectively provided by the RDBSS 232, the cache manager 240, memory manager 242, and the RAM cache 244 in the present example architecture.

It should be noted that the CSC mechanism 221 operates on the logical namespace, which is the namespace that the user sees. Note that this is in contrast to the redirectors, which work on the physical namespace, corresponding to the actual server on which the data is stored. Note that these two namespaces are identical for SMB, for example, unless there is a DFS junction point involved.

Figure 4:
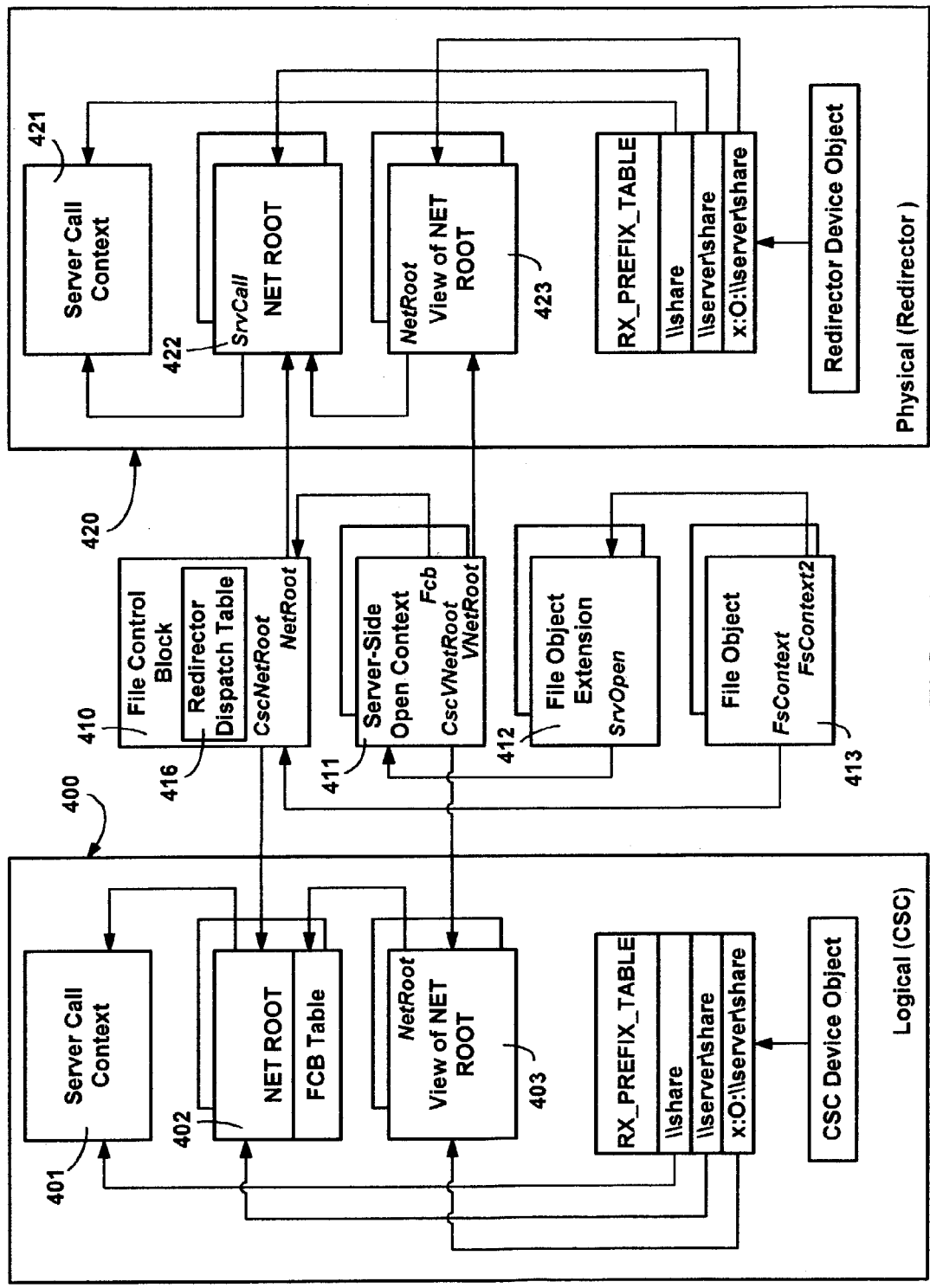
FIG. 4 is a block diagram generally representing data structures for implementing client-side caching when client-side caching is enabled in a network online state, in accordance with an aspect of the present invention.

In accordance with an aspect of the present invention, FIG. 4 represents logical connection-based data structures 400 and physical connection-based data structures 420 in both logical and physical namespace, and the relationships between them. Note that the CSC mechanism 221 maintains the connection-based data structures 400 in logical namespace, while each redirector maintains its connection-based data structures in physical namespace 420.

In general, the CSC mechanism 221 creates the logical connection data structures 400 and the shared file-based structures 410-412 when the MUP 230 receives a create file request and calls the CSC pre-process handler 226. Note that the file object 413 is created by the I/O manager 206 (FIG. 2). Further, note that a server can disable client-side caching, which the client-side caching mechanism will detect via its post-process handler 227.

The CSC's logical connection data structures 400 include a server call context 401, which comprises an abstraction of a server, e.g., including the locigal server name, CSC device object, CSC status flags, connection state and scavenger manager. The (at least one) net root structure 402 each comprise the abstraction of a share, including the share name, share type, CSC attributes, access rights, number of opens, and so forth. The (at least one) view of net root structure (VNetRoot) 403 each comprise the abstraction of a user's view of a share, including security context and user session information.

As represented in FIG. 4, the shared data structures include the file control block 410, along with at least one server-side open context 411, and at least one file object extension 412. The file control block 410 essentially comprises an abstraction of a file, and contains information for the file such as size data, timestamp data, a cache map, and so forth. The server side open context 411 comprises an abstraction of an open sent to the server, that is, a server file handle with desired and shared access rights. Note that the CSC mechanism 221 is like a server in this context, e.g., the handle to the file in the CSC store 215 will be maintained in this structure. The file object extension data structure 412 contains information associated with the file object 413.

As also represented in FIG. 4, when the system is online and client-side caching is enabled, these data structures 410-413 are shared between the CSC mechanism 221 and the redirector which claimed the path. As a result, file I/O requests can be executed by either the CSC mechanism 221 or the redirector that claimed the file's path, based on the circumstances as described below.

In one implementation corresponding to the architecture of FIG. 2, when a create request comes to the MUP 230, the MUP 230 calls the pre-process handler 226 (an entry point) of the CSC mechanism 221. The CSC mechanism 221 attempts to find the logical connection data structures (the server call context 401 server connection structure, the Net Root share mapping structure 402, and the per-user share VNetRoot mapping structure 403) for the file object that is issued with the create request. If not found, the CSC mechanism 221 creates these structures, e.g., via the RDBSS 232. If the connection is known to be offline, the CSC pre-process handler 226 returns a status of success, (or an error if appropriate), otherwise the CSC pre-process handler 226 returns a "more processing required" status, whereby the MUP 230 will call the DFS surrogate provider's pre-process, and then one or more of the redirectors 223-225 to attempt to open the path.

Figure 5:
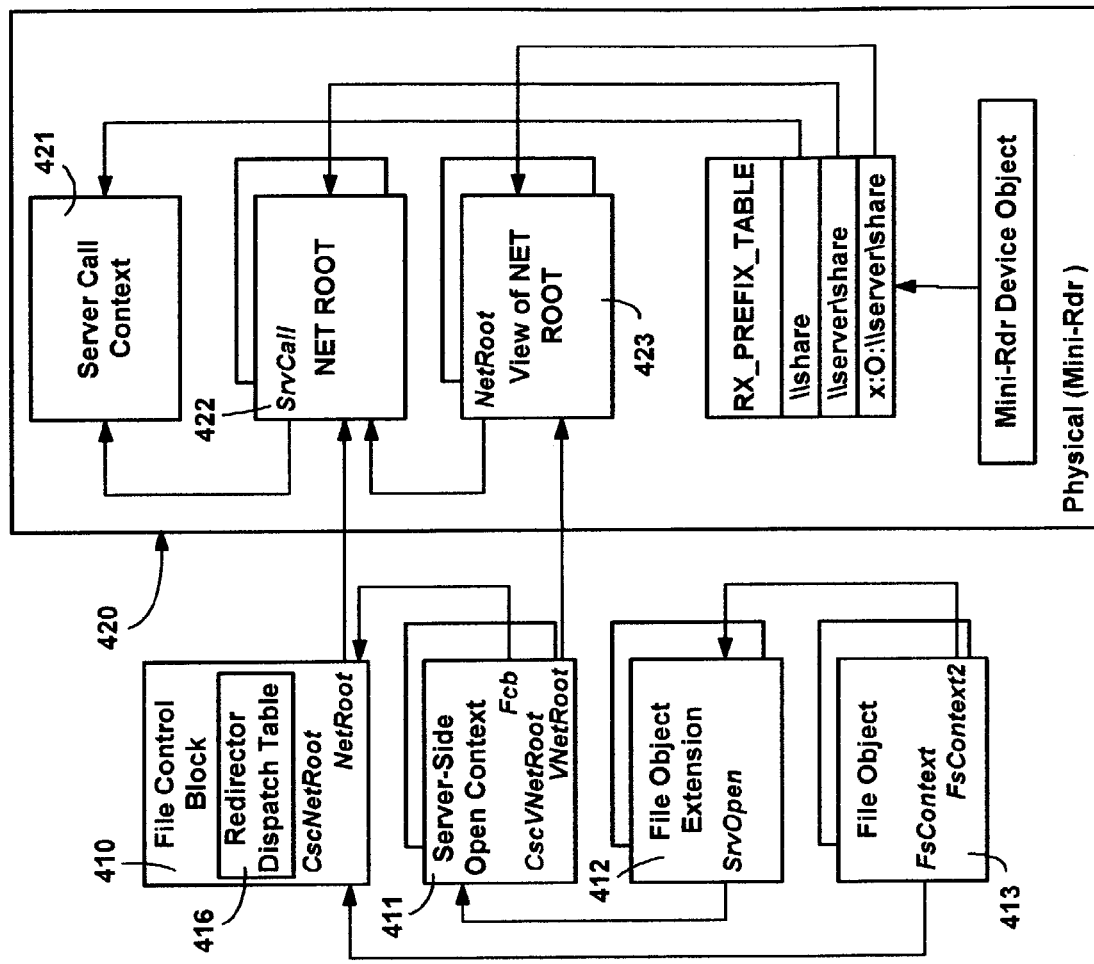
FIG. 5 is a block diagram generally representing data structures for handling network file-related requests via the network when client-side caching is disabled, in accordance with an aspect of the present invention.
Figure 6:
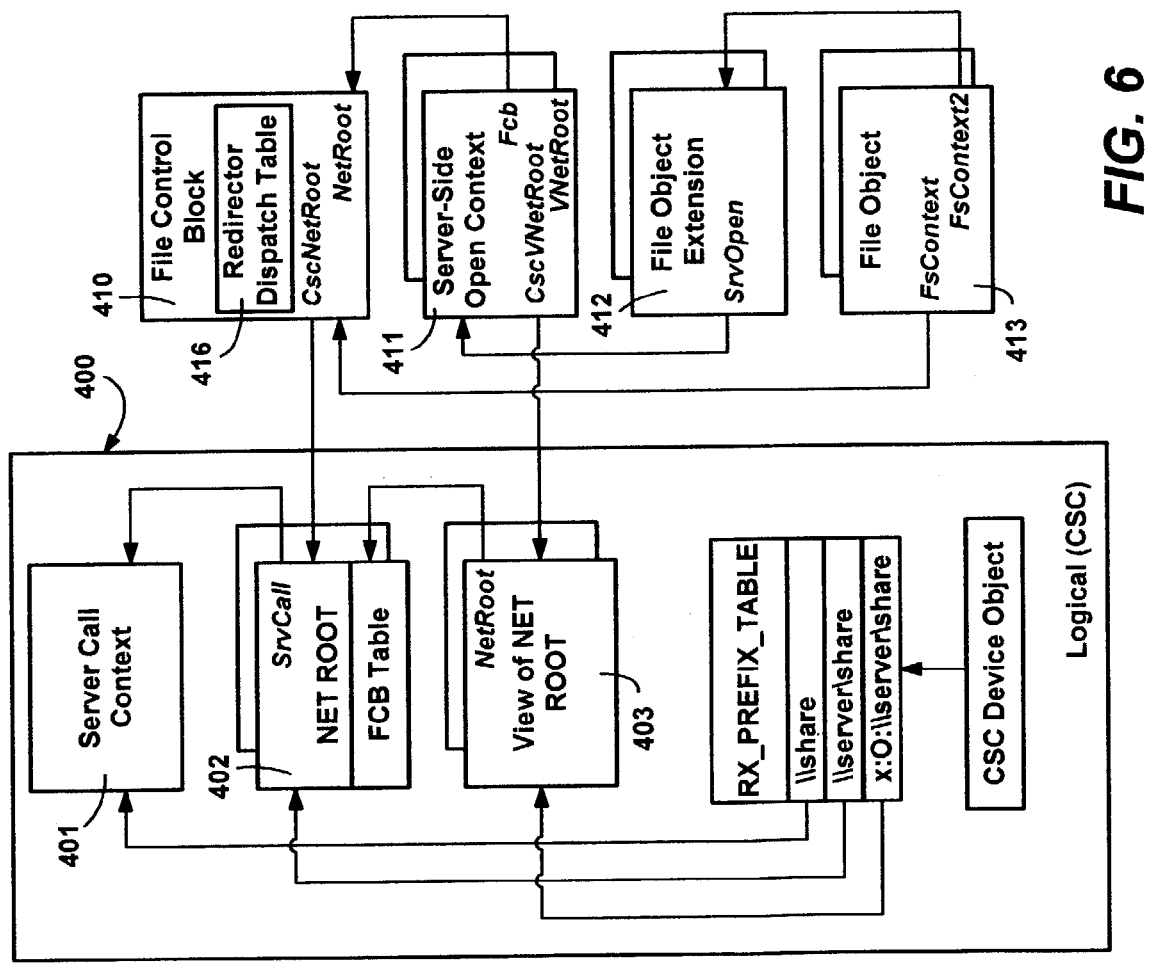
FIG. 6 is a block diagram generally representing data structures for implementing client-side caching when operating in a network offline state, in accordance with an aspect of the present invention.
Figure 7:
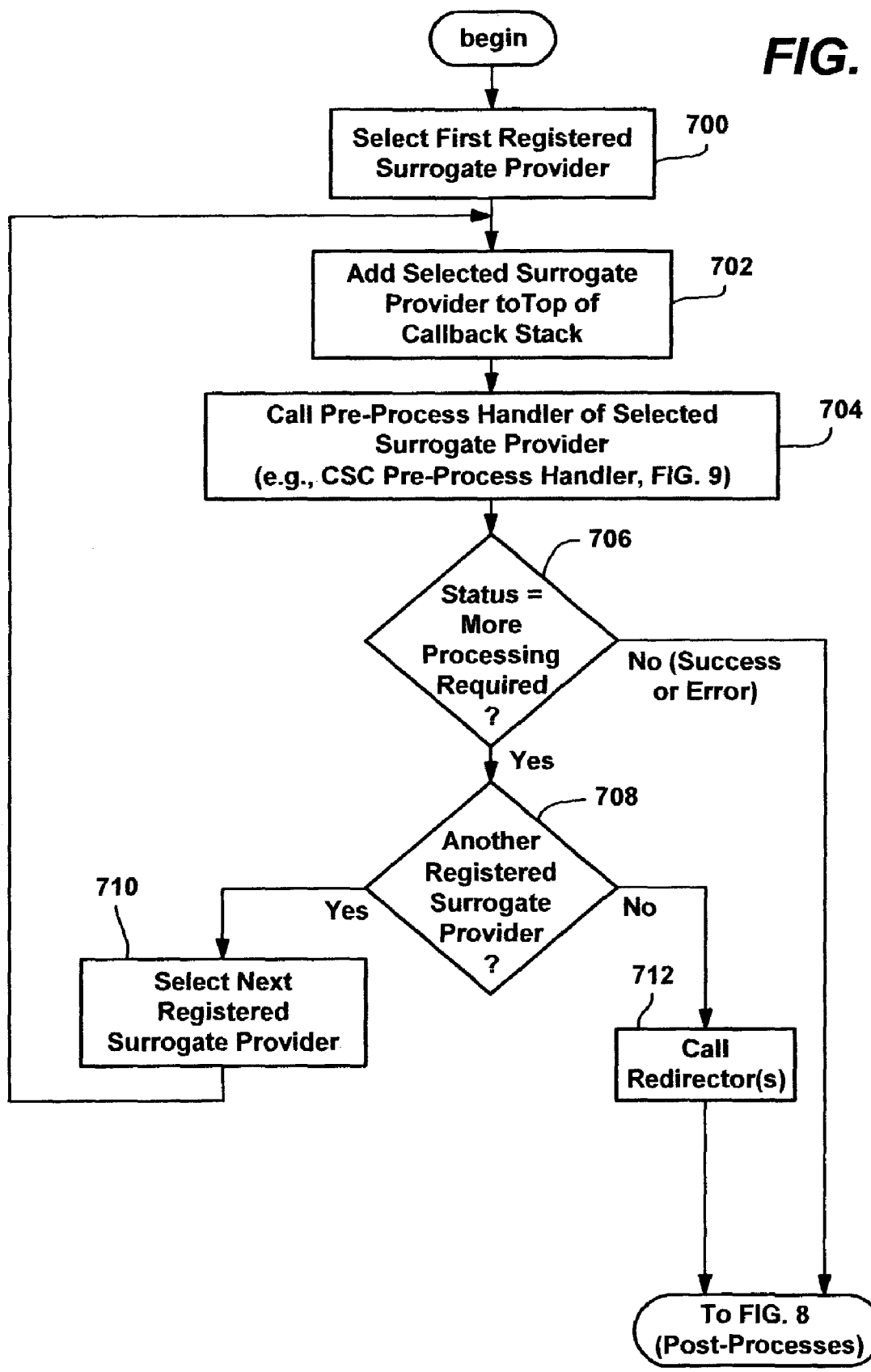
FIG. 7 is a flow diagram generally representing example logic for calling registered surrogate providers, including a client-side caching mechanism (surrogate provider), in a pre-processing call, in accordance with an aspect of the present invention.

On a successful open of the path (the connection is online), the connection-based physical structures 420 are established at the appropriate redirector, and a handle is available to the file. The MUP 230 calls the CSC post-process handler 227, which can obtain the file extension, size and caching flags of the path by looking at the physical net root of the FCB. Once this information is obtained, the CSC mechanism 221 can decide (in its post-process) whether to own this file object, e.g., if the share indicates that caching is enabled for this file (the file is a cacheable share, or if the redirector indicates that caching is to be on all the time, such as for WebDAV). If enabled, the CSC mechanism 221 claims ownership and completes the file data structures for the open instance 410-412 represented by this file object. If the share is marked non-cacheable, the CSC mechanism 221 will disassociate itself from the file object, may clean up any CSC data structures, and thereafter will not see the operations against this file object. The remaining data structures for such a client-side-caching disabled mode of operation are generally represented in FIG. 5. Note that the CSC mechanism 221 maintains the connection data structure for some amount of time, even if the connection data structure is a non-cacheable path. In contrast, when client-side caching is enabled but the connection is offline for this path, there are no data structures for the physical connection, as generally represented in FIG. 6.

Note that the server may indicate (via a lock mechanism or the like) that the file operations for this file should be handled by client-side caching until instructed otherwise, e.g., until the server changes the type of locking. Subsequent I/O operations on the file will be executed offline, until otherwise notified, e.g., the server changes the type of lock (e.g., an opportunistic lock, or oplock), because another user has requested access to the file.

Turning to an explanation of the operation of the present invention with reference to the flow diagrams of FIGS. 7-13, FIG. 7 represents the general flow of control in the example architecture of FIG. 2, between the MUP 230, the CSC and DFS surrogate providers (221 and 222, respectively) and the redirectors 223-225. As represented at step 700 and as described above, on a create request, the MUP 230 selects the first of the surrogate providers, which in the present example is the CSC mechanism 221, logically tracks the pre-calling order via step 702, and invokes (calls) the pre-process handler of the selected provider at step 704. The CSC pre-process handler 226 operation for a create request is generally described below with reference to FIG. 9.

Unless the called surrogate provider completes the request with a "success" or "error" status instead of a "more processing required" status, as detected at step 706, the MUP 230 will call other surrogate providers via steps 708 and 710 (which loops back to step 702), in this example only the DFS surrogate provider 222, until no surrogate providers remain to be called. Note that in a situation in which the CSC mechanism 221 detects that the connection is offline, (e.g., via connectivity state data 250 (FIG. 2) in the data structures as represented in FIG. 4, the CSC mechanism 221 handles the file I/O create request offline, and then returns a status other than more processing required, that is, success or error, so that no network-related components need be accessed.

In an online (or unknown connection state) situation, after the pre-process calls to the surrogate providers, step 708 branches to step 712 which represents the calling of the redirector or redirectors. Note that on a file create/open request, as described above, multiple redirectors may be called to locate one that claims the path, unless the path for this create has previously been claimed, whereby the MUP 230 knows which redirector to call. On subsequent I/O requests related to that path, including those directed to read or write operations, the MUP 230 calls the redirector that previously claimed the path or claimed it as part of the create/open request, e.g., the DAV redirector 225 for purposes of this example.

Figure 8:
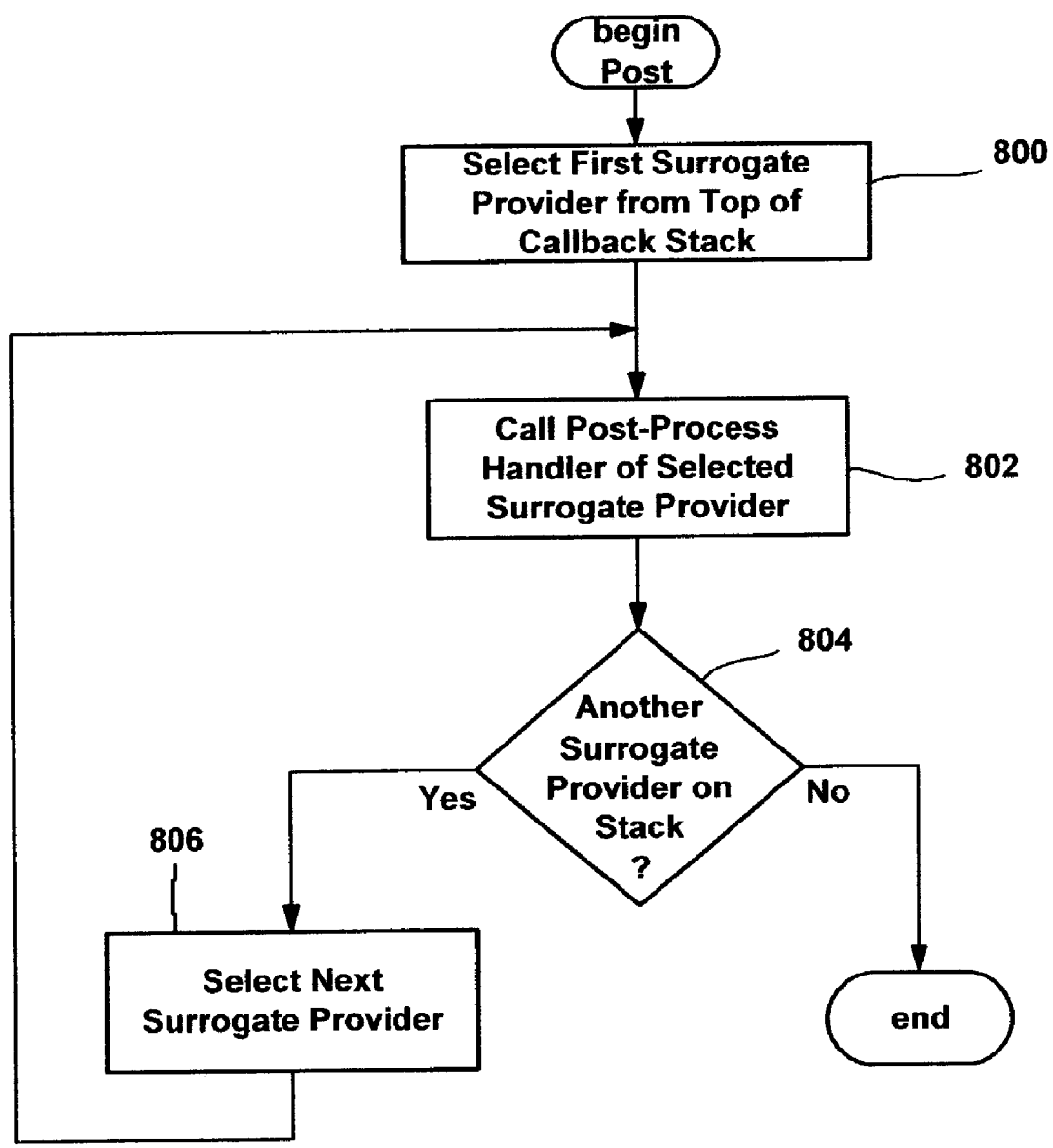
FIG. 8 is a flow diagram generally representing example logic for calling registered surrogate providers, including a client-side caching surrogate provider, in a post-processing call, in accordance with an aspect of the present invention.

FIG. 8 represents the MUP 230 calling the surrogate providers' post-process handlers, following the pre-process call (or calls) and any calls to the redirectors. At step 800, the MUP selects the surrogate provider that was last called in the pre-process calling order, which in the present (online) example is the DFS surrogate provider 218, and calls it at step 802. Steps 804 and 806 represent repeating the post-process call for other surrogate providers, in reverse order of the pre-process calling order. In the present example, the only surrogate provider remaining to be called is the CSC mechanism 221. The CSC post-process handler 227 operation for a create request is generally described below with reference to FIG. 10. Note that in an offline situation, step 706 would branch to step 712 with only the CSC pre-process handler 226 having been called, whereby step 802 would call the CSC post-process handler 227 but there would be no other surrogate providers to call, as detected by step 804.

Figure 9:
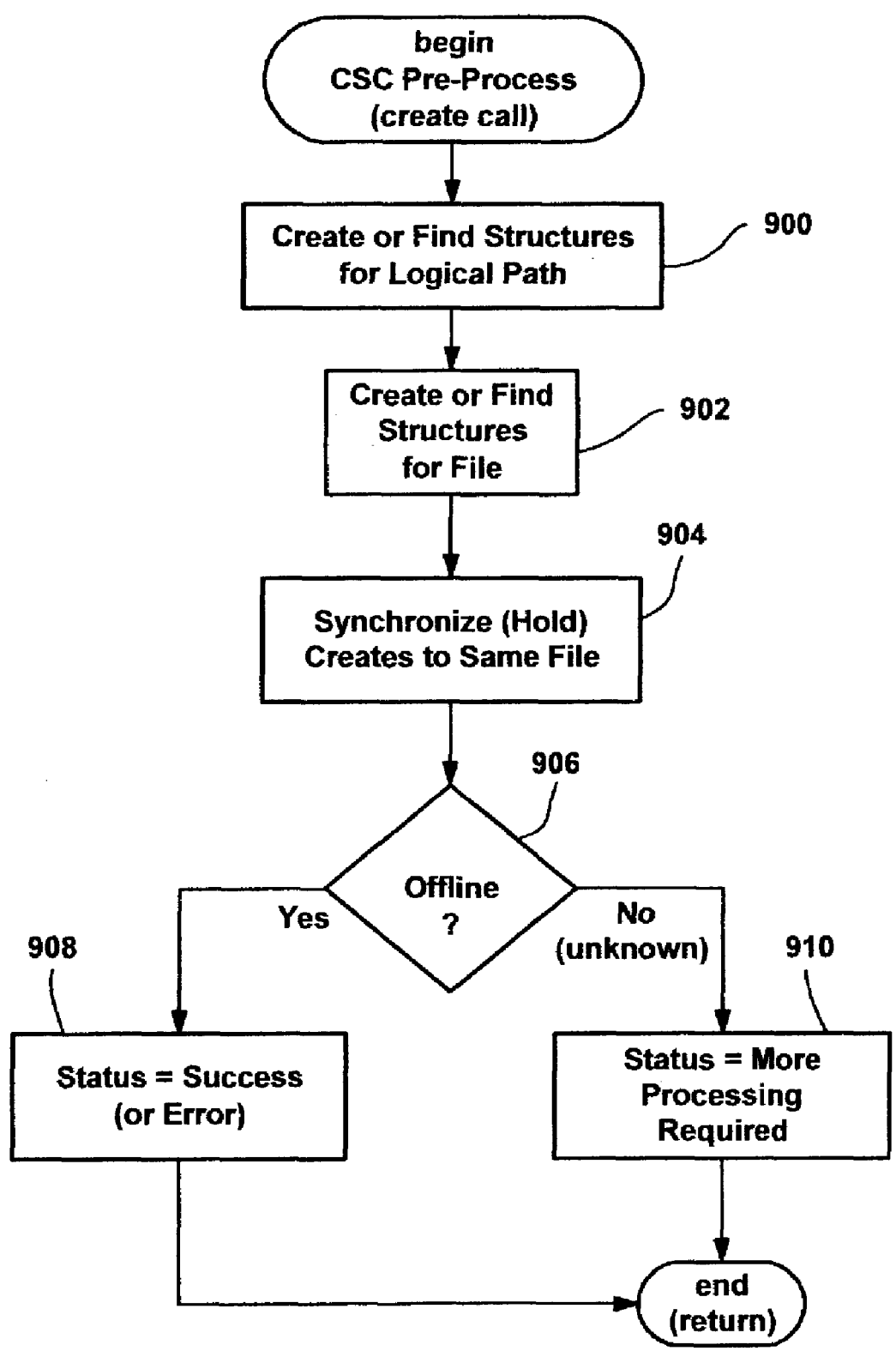
FIG. 9 is a flow diagram generally representing example logic for handling a create call in the client-side caching mechanism's pre-process handler in accordance with an aspect of the present invention.

FIG. 9 represents the operation of the CSC pre-process handler 226 when called by the MUP 230 in response to a create request. Beginning at step 900, the CSC pre-process finds or creates the logical structures 400, as generally described above with reference to FIG. 4. Step 902 represents the collapsing or creation of the shared structures 410-412 (FIG. 4) associated with the file object 413. Note that as with other server files, any create/open requests directed to the same file are held in the correct order (synchronized) as represented by step 904, e.g., so that the subsequent open may be collapsed on this open without being sent to the server. Step 906 tests whether the connection is known to be offline, in which event there is only the CSC store 215 available, and there is no need to involve the network resources, whereby the pre-process handler branches to steps 908 to return a success (or an error). Otherwise, the pre-process handler branches to step 910 to return the "more processing required" status, such that the network-related components (DFS and the redirectors) will be contacted, which will establish the online or offline state, as described above.

It should be noted that online or offline is established for each file at the time of that file's create/open request handling. An offline connection may be determined in the CSC pre-process if known from other create requests, or if unknown during the CSC pre-process, is determined in the CSC post-process based on what happened when the redirector or redirectors were called, as described below. For example, if a redirector claimed the path, created the structures and did not return a network error, an online connection is established, otherwise offline is established. In one implementation, the offline versus online status determined at create time does not change for a file (until closed and re-opened), regardless of the actual connection state during subsequent I/O requests. Thus, even if the network was online at file create/open time, but goes offline while the file is open, the MUP 230 continues to pass requests to the redirector for that path, as described below. Note that because of the buffering service and/or client-side caching, there may be no errors in handling such subsequent requests, unless the redirector is actually needed to communicate with the disconnected server. Alternatively, if the network was offline at file create/open time, but goes online while the file is open, the client-side pre-process continues to process the requests as if offline, for one because the MUP 230 has not involved DFS and there is no redirector known to the MUP 230 for this file.

Figure 10:
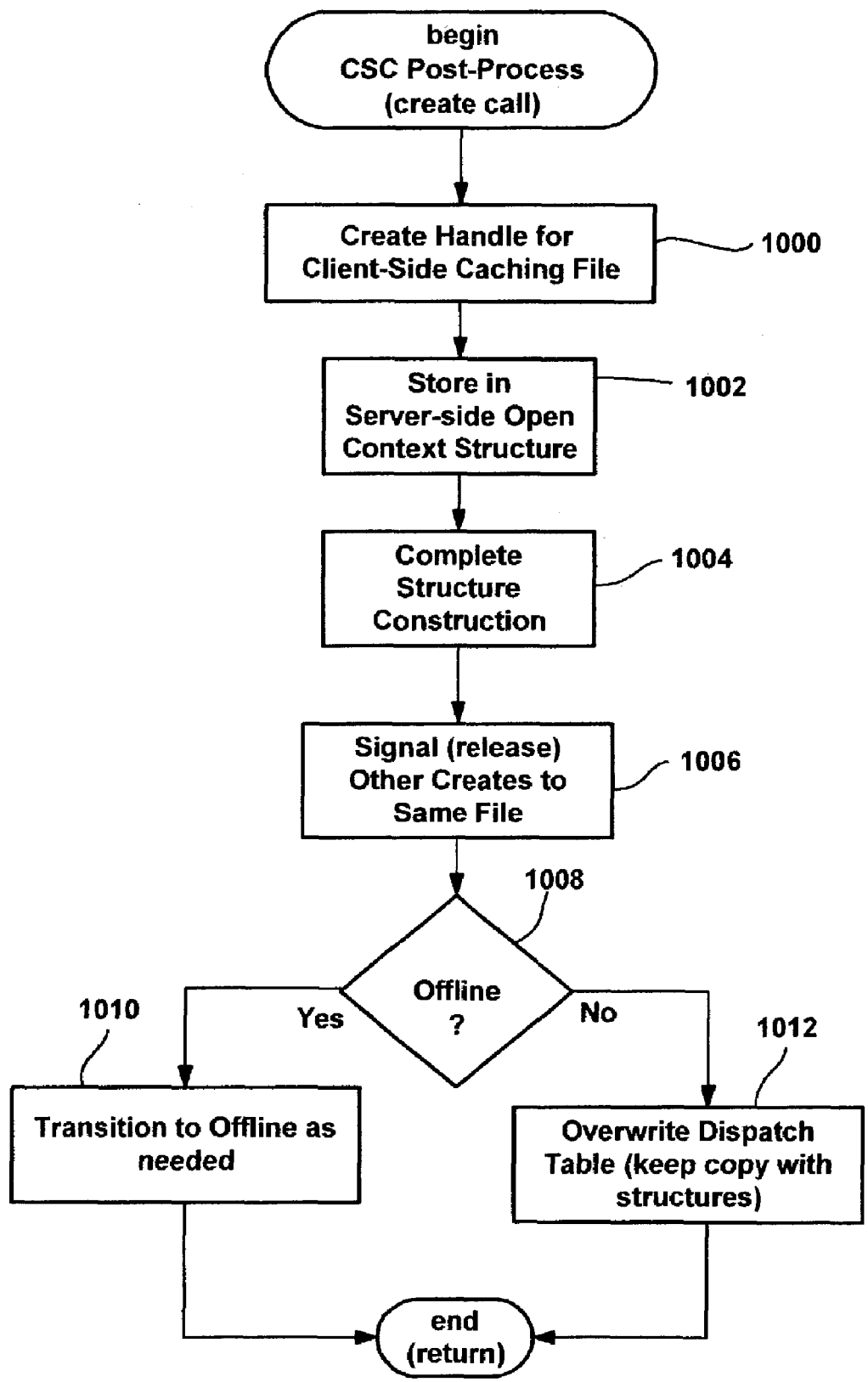
FIG. 10 is a flow diagram generally representing example logic for handling a create call in the client-side caching surrogate provider post-process handler in accordance with an aspect of the present invention.

FIG. 10 represents the operation of the CSC post-process handler 227 when called by the MUP 230 in response to a create request, which may be directly after the pre-process call if offline or after the redirectors (and other surrogate provider or providers) have been called if the connection state was unknown. Note that although not shown in FIG. 10, if after involving the (at least one) redirector, client-side caching is disabled for this file by the server, the CSC mechanism 221 will essentially remove itself via the post-process for further calls directed to this file.

Beginning at step 1000, the CSC post-process handler 227 creates a handle for the client-side caching file, e.g., as returned by a local file system for the file in the CSC store 215. As described above, one of the file structures comprises the server-side open context 411 (FIG. 4), where the CSC post-process handler 227 stores the handle at step 1002, that is, the CSC post-process handler 227 stores the handle for the local cache representing the logical path, rather than the physical. At step 1004, the structures are completed for this file, e.g., the various data put in the appropriate structures. Step 1006 represents releasing any of the other creates that may be being held (at step 904 of FIG. 9).

It should be noted that when the CSC post-process 227 is called, the CSC post-process handler 227 looks for redirector-related errors indicative of an offline situation. This handles the case in which the pre-process handler 226 did not know whether the connection was online or offline. To this end, the CSC post-process 227 may look for whether the connection is now known to be online, such as by looking for physical connection information in the data structures, and/or for completion status from the other surrogate provider or redirector. If there is a connection error, e.g., no redirector claimed the path, the post-process handler transitions the state to offline for this file, that is, the CSC post-process 227 will transition the state to offline in the data structures, so that subsequent requests will be completed offline by the CSC pre-process handler (without involving any redirector), as described below. In other words, following a transition-to-offline situation, subsequent I/O requests are completed by the CSC surrogate provider's pre-process handler 226, (and the CSC will return a status other than more processing required), so that the MUP 230 will not send the request to a redirector (which in any event may not be known to the MUP 230).

Step 1008 represents testing for whether the connection is offline, which may or may not have been previously known. If offline, step 1010 is executed, which represents performing any transitioning to offline that may be required, such as to clean up any physical connection-based data structures that may exist, and so on. If online, step 1012 is executed, which represents overwriting the dispatch table 416 of the FCB 410 with a reference to the CSC mechanism 221, instead of the redirector that claimed the path.

More particularly, as described below with reference to FIGS. 11-13, the architecture of the present invention has accomplished protocol-independent client-side caching with only a slight amount of change to the way in which the RDBSS 232 and redirectors work together. For example, the RDBSS 232 and redirector components act substantially as before, e.g., the redirectors claim paths, call into the RDBSS 232 to see if needed data is cached locally in memory, and so on. The RDBSS 232 also operates essentially as before, e.g., creating structures as requested, calling the cache manager to cache writes when appropriate or look for whether requested data is cached to satisfy a read request, and if so returning with the data, and so on. However, as described below, when the RDBSS 232 needs file data such as to satisfy an I/O request and the data is not in the in-memory cache 244, the cache manager 240/memory manager 242 generates a read IRP. However, when this read IRP reaches the RDBSS 232, instead of passing control to the redirector to obtain the data, the overwriting of the dispatch table entry causes the RDBSS 232 to call the CSC mechanism 221, thus giving the CSC mechanism 221 an opportunity to use the CSC store 215 to satisfy the request. In this manner, the CSC mechanism 221 is transparently involved in the flow of control between the RDBSS 232 and the redirector that claimed the path, regardless of the network protocol of the redirector.

Figure 11:
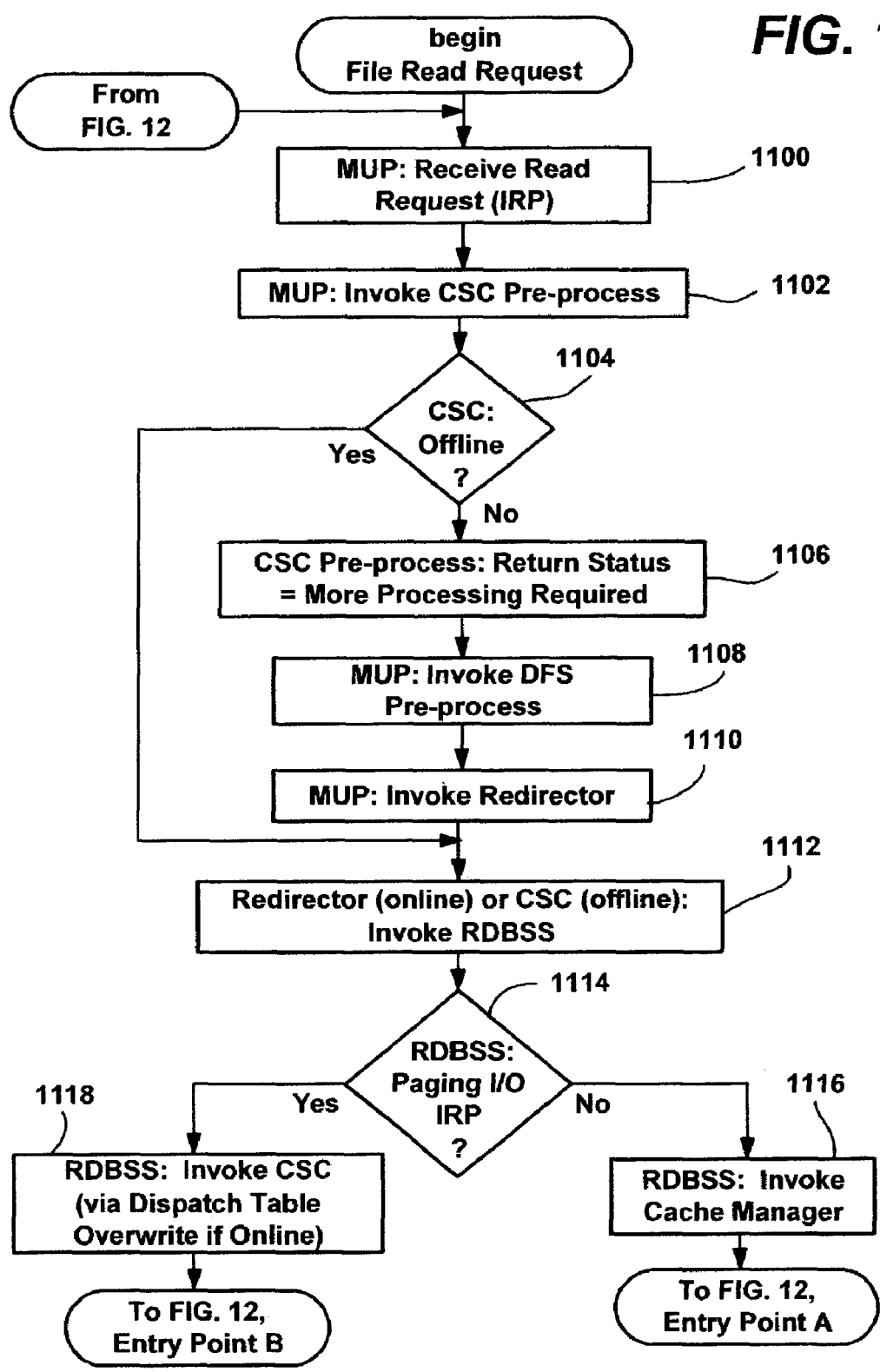
Figure 12:
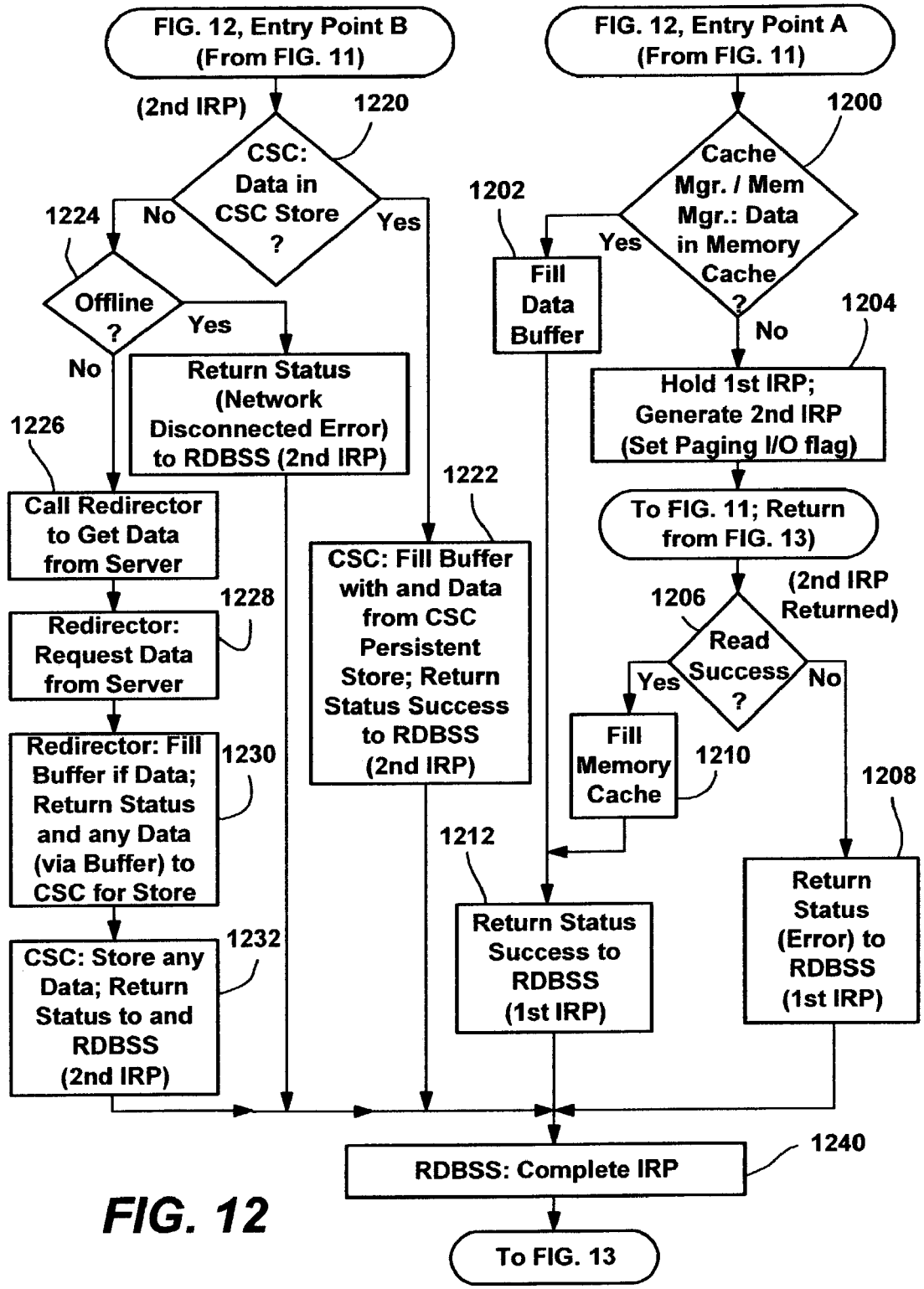

FIGS. 11-13 describe one way in which the CSC mechanism 221 is transparently inserted to intercept a read request, in particular when client-side caching is allowed. For purposes of simplicity, FIGS. 11-13 do not represent other operating states, including when read caching is not allowed; instead this condition is described as follows, that is, before any read from the persistent store 215, the CSC mechanism 221 needs to know the buffering state of the file, because if the buffering state is such that read caching is not allowed, (e.g., in one implementation the buffering state is at the equivalent of OPLOCK_LEVEL_NONE), then the CSC mechanism 221 does not return the data from the CSC store 215, and instead lets the read request go to the underlying provider. The buffering state information in one implementation may be obtained by checking the FCB_STATE_READCACHING_ENABLED flag on the FCB.

At step 1100, the overall read request processing begins when the MUP 230 receives the request, e.g., as an IRP from the I/O manager 206. At step 1102, the MUP 230 invokes the CSC pre-process handler 226, which when online as tested via step 1104, results in the "more processing required status" being returned at step 1106. Note that if the system is offline, then the CSC pre-process handler 226 handles the request, represented in FIG. 11 by step 1104 branching to step 1112.

For a read request in the online state, when the CSC pre-process handler 226 returns the more processing required status at step 1106, the MUP 230 invokes DFS pre-process at step 1108 to perform any of its DFS pre-processing operations, such as to record the file I/O operation. After this call, at step 1110 the MUP 230 invokes the redirector (e.g., 225) that previously claimed the path for this particular file.

Regardless of whether the CSC pre-process (offline) or redirector (online) has the request, the RDBSS 232 is invoked at step 1112, essentially to determine whether the needed data is in the memory cache 244, such as due to a previous read or write request. When the data is not locally present in memory (a cache miss occurs), as described below, the buffering service (e.g., the cache manager 240/memory manager 242) will generate a second IRP with a paging I/O flag set, generally for the purpose of having another entity get the data. Thus, the RDBSS 232 will need to check whether the IRP was generated by the cache miss condition, e.g., via the paging I/O flag setting or the like, because if so, it means that the RDBSS 232 should not repeat what it previously did and call into the cache manager to look for the same data another time, as this would again issue an IRP when not found, (which essentially would be an infinite loop). Instead, the RDBSS 232 needs to call out to have the data retrieved elsewhere. This test is represented at step 1114. Note that a file may be opened in a manner that does not allow buffered I/O, in which event the data will likewise not be cached; step 1114 can also detect this condition and branch accordingly to step 1118. For purposes of simplicity, the present example will be described with reference to buffered I/O, except where otherwise noted.

In the present example, at this time, the IRP was generated by the I/O manager 206, and thus step 1114 branches to step 1116, to call the cache manager 240, which in turn works with the memory manager 242 to look in the in-memory (RAM) cache 244 for the requested data. Step 1200 of FIG. 12 represents the cache manager 240/memory manager 242 making the determination as to whether there is a cache hit or cache miss, buffering the data (step 1202) and returning success (step 1212) to the RDBSS 232 on a cache hit, or generating the second IRP on a cache miss, as represented by step 1204. On a cache hit with the first IRP, the RDBSS 232 completes this (first) IRP, as represented at step 1240 and as generally described below with reference to FIG. 13. On the cache miss, the second IRP is generated at step 1204, and like the first IRP, is received at the MUP 230 at step 1100 of FIG. 11.

Returning to FIG. 11, if and when the second IRP is received at step 1100, the other steps (e.g., 1102-1112) will be executed as described above, eventually reaching step 1114, again regardless of whether offline or online. This time however, step 1114 will detect the paging I/O flag of this (second) IRP for the read.

In accordance with an aspect of the present invention and as described above, when online, in the CSC post-process for the file create/open request, the CSC post-process handler 227 had previously overwritten the redirector pointer in the dispatch table 416 in the FCB 410 (FIG. 4) so that the RDBSS 232 will call the CSC mechanism 221 in this situation, as represented via step 1118, instead of the redirector 225. This gives the CSC mechanism 221 a chance to look in the CSC store 215 for the requested data, instead of first having the redirector 225 request the data from the server. Note that this is transparent to the RDBSS 232, which simply calls the CSC mechanism 221 based on the pointer data in the FCB's dispatch table 416. In this manner, the CSC mechanism 221 essentially acts like an extension to the RDBSS 232 from the perspective of the redirector, yet acts as the appropriate redirector from the perspective of the RDBSS 232, although essentially transparent to both. Further, note that in the offline case, the CSC pre-process handler 226 called RDBSS 232 (no redirector is involved), and thus the RDBSS 232 will call back to the CSC pre-process handler 226 at step 1118. Thus, in either the online or offline case, code of the CSC mechanism 221 gets called.

In this manner, on a cache miss, step 1220 of FIG. 12 is executed, which represents the CSC mechanism 221 checking its persistent data store 215 for the requested data. Note that the requested data will be there unless the file is sparse, and thus step 1220 can include a test as to whether the file is sparse, (or alternatively, if sparse, step 1220 can test for whether the requested data happens to be present). If found, the CSC mechanism 221 acts like a redirector from the perspective of the RDBSS 232, as the CSC mechanism 221 will retrieve the data that the RDBSS 232 was unable to obtain from local memory, and return the data in response to the call at step 1222, e.g., by filling the data into a buffer associated with the IRP and providing a success status to the RDBSS 232, as represented by step 1222. The RDBSS 232 completes this second IRP as represented by step 1240 and described below with reference to FIG. 13 (which will return to the initiator (e.g., the cache manager 240/memory manager 242 at step 1206, described below).

In the event that at step 1220 the CSC mechanism 221 did not have access to the requested data, then if online, the CSC mechanism 221 can request the redirector (e.g., 225) to obtain the data from the server. However, if offline as detected by step 1224, the CSC mechanism 221 will need to return an error (e.g., indicating that the network is disconnected) to the RDBSS 232. Note that this is like the error any redirector would return if previously online but disconnected; again the CSC mechanism 221 emulates a redirector from the perspective of the RDBSS 232. To this end, the CSC mechanism 221 calls to the redirector 225 as if the CSC mechanism 221 was the RDBSS 232 at step 1226. The redirector 225 then communicates with the appropriate server to attempt to retrieve the requested data, as represented by step 1228. If the read was successful, the data is buffered by the redirector (in a buffer associated with the IRP) which returns success to the CSC mechanism 221, (as if the CSC mechanism 221 was the RDBSS 232), whereby the CSC mechanism 221 caches the data in the CSC persistent store 215 at step 1232, and provides a success status to the RDBSS 232 to complete the IRP at step 1240. Note that if the read was unsuccessful, there is nothing for the CSC mechanism 221 to cache, and thus only an error status is returned by the redirector to CSC mechanism 221, and the CSC mechanism 221 to the RDBSS 232.

Following step 1240, the completed IRP (whether successful or unsuccessfully completed, and whether the first or second IRP) thus travels back up the driver stack, which reaches the MUP 230. However, the stack order through which the IRP travels is different depending on whether the connection is online or offline. Note that there is no actual test for offline versus online at this time, however step 1300 conceptually represents two possible paths through the stack that the IRP may take depending on offline versus online. For example, in the online case, the IRP will travel from the RDBSS 232 to redirector to the MUP 230, as represented by steps 1302 and 1308. Note that the redirector simply passes the IRP to the MUP 230.

Alternatively, in the offline case, the MUP has only called the CSC pre-process 226, which in turn invoked the RDBSS 232. Thus, the IRP is returned to the CSC pre-process 226, as represented via step 1304. The CSC pre-process 226 then returns the status is complete (or an error) to the MUP, as represented via step 1306 and 1308. In this manner, among-other things, the MUP 230 will not invoke the redirector, as described above with reference to FIG. 7.

Step 1310 represents the MUP 230 testing the status, so as to start calling the surrogate providers' post-processes, as described above with reference to FIGS. 7 and 8. Note that when the status is success (or error), this generally corresponds to step 706 of FIG. 7 branching to FIG. 8, although in the example of FIG. 13, the only other surrogate provider is the DFS surrogate provider 222. Thus, when online, the MUP 230 calls the post process handler of the DFS surrogate provider 222 at step 1312 and then the CSC post-process handler 227 at step 1314, and completes the request at step 1316. Otherwise, when offline, the MUP only calls the CSC post-process handler 227. It should be noted that the MUP need not actually test for online versus offline at step 1310, as this test may be inherent in the post-process calling stack, that is, essentially corresponding to step 806 of FIG. 8 when there is only the CSC post-process to call back.

The MUP 230 then completes the request as represented by step 1316. However, where the IRP is returned depends on whether the IRP was the first IRP initiated by the I/O manager 206, or the second IRP initiated by the cache miss. If the IRP is the first IRP, it is sent to the I/O manager 206, and from there data returned in response to the application program's read request. If the IRP is the second IRP, generated at step 1204, then this second IRP returns to the cache manager 240/memory manager 242, that is, the entity that generated it, at step 1206.

Step 1206 represents testing whether the read request made in the second IRP (cache miss condition) was successful. If not, the error is returned with the first IRP (step 1208) to the I/O manager 206 in response to the API call from the application program, as described above with reference to step 1240 and FIG. 13. If the read was successful, step 1210 is instead executed, which represents the cache manager 240/memory manager 242 filling the in memory cache 244 with the data buffered via the second IRP read request. The first IRP is then returned to the I/O manager 206 (and from there to the application program) with the data buffer filled, as described above with reference to step 1240 and FIG. 13.

In this manner, the RDBSS 232 and the redirector operate as before for a read request from their perspectives, yet the CSC mechanism 221 transparently inserts itself into the flow of control to satisfy read requests when the in-memory cache does not have the data. Note that when the in-memory cache 244 has the data, (a cache hit), the CSC mechanism 221 need not add the data to its store 215, because the data first got into the in-memory cache 244 at step 1210 via a second IRP, and was thus obtained from the CSC store 215 or already stored by the CSC mechanism 221 (from the redirector) at step 1232 as described above. There is thus no need to re-copy this data to the CSC store 215.

Turning to a consideration of write requests when client-side caching is enabled, write requests are very similar to read requests, except that the cache manager 240/memory manager 242 ultimately change the data in the memory cache 244. The changed memory cache 244 (e.g., considered changed or not on a per-page basis) has its changed (dirtied) pages flushed to the CSC store 215 and/or the server in various ways, described below. Note that to change data for a write request in the in-memory cache 244, each page of data to be changed (even if only part of the page is changed) needs to be in the memory cache 244. Thus in the example implementation described herein, on a cache miss for a write request, the needed data is first read into the cache by generating a second IRP (e.g., just as at step 1204 for the read request).

In general, for buffered I/O (which uses the cache 240), the flow diagrams of FIGS. 11-13 apply to writes as well as reads, except that instead of filling a buffer and returning it, a filled buffer of data to write modifies appropriate pages in the cache 240, whether those pages were initially in the cache 240 or needed pages had to be faulted (read) into the cache 240 via the second IRP mechanism described above for reads. Note that for non-buffered I/O, the RDBSS 232 knows not to call the cache manager 240 (e.g., based on information placed in the FCB at the time of create), and instead will call the CSC mechanism 221, e.g., via the dispatch table when online or back to the CSC pre-process when offline. Thus, non-buffered I/O writes essentially branch to step 1118 via step 1114 in FIG. 11 on the first IRP, similar to the second, paging I/O IRP.

When the CSC mechanism 221 is involved in an actual write request, (and not simply a read request generated on a cache miss to fill the in-memory cache 244 for a corresponding write request), e.g., for non-buffered I/O or when the cache is flushed, write operations may be handled by the CSC mechanism 221 acting as a write-through cache. In general, with a write-through cache, data is first attempted to be written to the server, and if successful, then the CSC mechanism 221 writes a copy to its persistent store 215. For example, if write caching is disabled or the file is sparse, the CSC mechanism 221 sends the write request directly to the redirector, and if the request is successfully completed by the redirector, the data then may be saved by the CSC mechanism 221, by writing a copy to its persistent store 215. If an error is returned from the redirector, the CSC mechanism 221 may attempt to transition to offline, and if successful, complete the request offline.

In one alternative, the CSC mechanism 221 can instead act as a write-back cache, by caching writes without first going to the server. Note that write-back caching is controlled by the server; in other words, when write caching is granted by the server, the CSC mechanism 221 will cache writes until the file handle is closed or the file's oplock (that grants the write-back caching privilege) is broken by the server. To this end, if write caching is allowed and the file is not sparse, the CSC mechanism 221 writes the requested data to the CSC persistent store 215, and returns a success status (or error if unsuccessful) to the caller. Note that before every write is executed, the CSC mechanism 221 determines the buffering state of the file. If the buffering state allows write-back caching, the CSC mechanism 221 writes the data to its persistent cache 215, and returns the write status (normally success) as described above. However, if the buffering state is such that the write should not be cached, e.g., the server has set an oplock at the equivalent of OPLOCK_LEVEL_II or less, then the CSC mechanism 221 does not cache the write and instead lets the write request go to the underlying redirector, as generally described above. The buffering state information can be obtained by checking the FCB_STATE_WRITECACHING_ENABLED flag of the FCB.

When the file is closed, the close request reaches the cache manager 240 via the RDBSS 232 in the general manner described above. If data in the cache 244 needs to be flushed, e.g., there is at least one dirtied page for this closed file in the cache 244, the cache manager 240/memory generate at least one paging I/O write request (IRP or IRPS), which each reach the CSC mechanism 211 in the same general manner as described above, e.g., via a call from the RDBSS 232 when the RDBSS 232 receives each write IRP.

The CSC mechanism 211 then writes to the persistent CS cache 215 based on each IRP received for this file.

To write back to the server, in one implementation, when a close request comes to the CSC mechanism 211, the SC mechanism 211 checks if there is any cached data from a previous write request on this file. If so, and if the server is online, the CSC mechanism 211 sends back sections having modified data (e.g., dirtied pages) to the server, by passing write requests to the appropriate redirector. After the cached data is pushed back to the server in this manner, the CSC mechanism 211 sends the close request to the redirector. Once the redirector completes the close request, the CSC pre-process handler 226 queries to obtain the timestamp from the server, sets it on the cached file, closes the cache file handle, and returns to the MUP 230. Thus writes may be cached until the file is closed, at which time the files are synchronized in this manner. Note that when there is no remote handle to the file, e.g., the connection associated with this file is offline the close request is only executed locally. Later synchronization can be performed.

As can be readily appreciated, existing application programs may work unmodified with the present invention, and send file I/O requests as before. However, other application programs may be aware of client-side caching. Such CSC-aware applications will improve the overall user experience, such as by using CSC-related API's to control grouping of files, ensure that certain files are always in the persistent store 215 ("pinned"), control synchronization frequency and access other CSC features.

Further, in one implementation, the CSC mechanism 221 may be aware of network connectivity state characteristics, such as availability, cost and speed. As can be appreciated, client-side caching, synchronization and other aspects of network communication may be controlled according to the current network connectivity characteristics at a given time.

As can be seen from the foregoing detailed description, there is provided a method and system that transparently provide protocol-independent client-side caching. The method and system fit within existing redirector architectures, to provide access to files when offline and/or online in a consistent manner.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, a method of protocol-independent client side file caching providing a uniform experience for a plurality of file server types, the method comprising:

inserting as a service within the computing environment, a protocol-independent client-side cache mechanism, the mechanism being enabled to handle file-related requests directed to a network, the mechanism registering with a system component that receives network file-related I/O requests, and the mechanism being enabled to satisfy said file-related requests via a client-side cache, wherein insertion of the client-side caching mechanism is accomplished, at least in part, by overwriting file system redirector device object data;

receiving an I/O request initiated from an application program directed to creating or opening a network file on a server;

calling a client-side caching pre-process, the client-side caching pre-process claiming a path to a copy of the file in logical namespace;

calling a redirector, the redirector claiming a path to a copy of the network file in physical namespace and providing redirector data for association with the file such that a buffering service can call back to the redirector;

calling a client-side caching post-process, the client-side caching post-process modifying the redirector data associated with the file such that the buffering service will call back to the client-side caching mechanism; and the client-side caching mechanism maintaining a copy of the redirector data in association with the file, so that the client-side caching mechanism can communicate with the redirector.

2. The method of claim 1 wherein the client-side caching pre-process creates a plurality of data structures associated with the copy of the file in logical namespace.

3. The method of claim 1 wherein the client-side caching pre-process creates a plurality of shared data structures associated with a file object that represents the network file.

4. The method of claim 3 wherein one of the shared data structures comprises a file control block, and wherein the redirector information associated with the file comprises a pointer maintained in the file control block and modified in the file control block by the client-side caching post-process to comprise a pointer to the client-side caching mechanism.

5. The method of claim 1 wherein the redirector creates a plurality of data structures associated with the network file on the server.

6. The method of claim 1 further comprising, preserving the redirector information associated with the file before modifying the redirector information such that the client-side caching mechanism can call to the redirector.

7. The method of claim 1 further comprising, receiving an I/O read request directed to reading data from the network file, providing the I/O read request to the redirector, calling the buffering service from the redirector, the buffering service including a cache/memory management component that looks for the requested data in a memory cache, and if found, the buffering service completing the read request, and if not found, the buffering service invoking the client-side caching mechanism.

8. The method of claim 7 further comprising, obtaining the requested data via the client-side caching mechanism, and providing the requested data from the client-side caching mechanism to the buffering service.

9. The method of claim 7 wherein the client-side caching mechanism seeks the requested data in a client-side persistent store, and if not found, invokes a redirector to request the requested data from the server.

10. The method of claim 9 wherein redirector locates the data, and wherein the client-side caching returns data to the buffering service in response to the buffering service's invoking of the client-side caching mechanism.

11. The method of claim 7 further comprising, calling the pre-process handler before providing the read request to the redirector.

12. The method of claim 7 wherein invoking the client-side caching mechanism comprises issuing a second read request including information indicating that the buffering service should not seek the requested data from the memory cache.

13. The method of claim 12 wherein the cache/memory management component of the buffering service issues the second read request, and wherein the information indicating that the buffering service should not seek the requested data from the memory cache comprises a flag associated with the second read request.

14. The method of claim 12 wherein invoking the client-side caching mechanism further comprises, receiving the second read request at the buffering service, recognizing from the information that the buffering service should not seek the requested data from the memory cache, and calling the client-side caching mechanism based on the information associated with the file that was modified by the client-side caching post-process.

15. The method of claim 12 further comprising, obtaining the requested data via the client-side caching mechanism, and providing the requested data from the client-side caching mechanism to the buffering service, the buffering service completing the second request.

16. The method of claim 15 wherein completing the second request comprises returning data to the cache/memory management component, the cache/memory management component completing the first request based on the data returned.

17. The method of claim 16 wherein the cache/memory management component further adds the requested data obtained from the second request to the memory cache.

18. The method of claim 1 further comprising, receiving a first I/O request directed to writing data to the network file, providing the write request to the redirector, calling the buffering service from the redirector, the buffering service including a cache/memory management component that looks for the requested data to be overwritten in a memory cache, and if found, the buffering service completing the write request, and if not found, the buffering service invoking the client-side caching mechanism.

19. The method of claim 18 further comprising, obtaining the requested data to be overwritten via the client-side caching mechanism, and providing the requested data from the client-side caching mechanism to the buffering service.

20. The method of claim 18 wherein the client-side caching mechanism seeks the requested data in a client-side persistent store, and if not found, invokes a redirector to request the requested data from the server.

21. The method of claim 20 wherein redirector locates the data, and wherein the client-side caching returns data to the buffering service in response to the buffering service's invoking of the client-side caching mechanism.

22. The method of claim 18 further comprising, calling the pre-process handler before providing the write request to the redirector.

23. The method of claim 18 wherein invoking the client-side caching mechanism comprises issuing a second request corresponding to a read request, the second request including information indicating that the buffering service should not seek the requested data from the memory cache.

24. The method of claim 23 wherein the cache/memory management component of the buffering service issues the second request, and wherein the information indicating that the buffering service should not seek the requested data from the memory cache comprises a flag associated with the second request.

25. The method of claim 23 wherein invoking the client-side caching mechanism further comprises, receiving the second request at the buffering service, recognizing from the information that the buffering service should not seek the requested data from the memory cache, and calling the client-side caching mechanism based on the information associated with the file that was modified by the client-side caching post-process.

26. The method of claim 23 further comprising, obtaining the requested data via the client-side caching mechanism, and providing the requested data from the client-side caching mechanism to the buffering service, the buffering service completing the second request.

27. The method of claim 26 wherein completing the second request comprises returning data to the cache/memory management component, the cache/memory management component completing the first request based on the data returned.

28. The method of claim 27 wherein the cache/memory management component completes the first request, including writing requested data obtained from the second request to the memory cache, and modifying the requested data based on the write request.

29. The method of claim 18 further comprising, receiving a close request.

30. The method of claim 29 further comprising, in response to the close request, flushing any data in the memory cache that is modified relative to corresponding data in a client-side persistent store to the client-side caching mechanism for writing to the client-side persistent store.

31. The method of claim 30 wherein flushing any data comprises, issuing a write request.

32. The method of claim 29 further comprising, closing a file copy corresponding to the network file in the client-side persistent store.

33. The method of claim 29 further comprising, in response to the close request, invoking the redirector so as to flush any data in the client-side persistent store that is modified relative to corresponding data in the network file to the server for writing to the network file.

34. A computer program product comprising one or more computer-readable storage media having recorded thereon computer-executable instructions which, when executed, perform the method of claim 1.

35. The computer program product of claim 34 in which the method further comprises preserving the redirector information associated with the file before modifying the redirector information such that the client-side caching mechanism can call to the redirector.

36. The computer program product of claim 34 in which the method further comprises the client-side caching mechanism registering as a surrogate provider with a system component that receives network file-related I/O requests.

37. The computer program product of claim 34 in which the method further comprises the client-side caching mechanism generating and configuring data structures needed to handle requests subsequent to a file create.

38. A computer system comprising one or more computer processors and one or more computer-readable storage media storing computer-executable instructions that, when executed, implement the method recited in claim 1.

39. The computer system of claim 38 in which the method further comprises preserving the redirector information associated with the file before modifying the redirector information such that the client-side caching mechanism can call to the redirector.

40. The computer system of claim 38 in which the method further comprises the client-side caching mechanism registering as a surrogate provider with a system component that receives network file-related I/O requests.

41. The computer system of claim 38 in which the method further comprises the client-side caching mechanism generating and configuring data structures needed to handle requests subsequent to a file create.

* * * * *